(12) United States Patent
Ballow et al.

(10) Patent No.: US 7,983,973 B2
(45) Date of Patent: *Jul. 19, 2011

(54) FUTURE VALUE ANALYTICS

(75) Inventors: John J. Ballow, Eatons Neck, NY (US);
Brian F. McCarthy, Atlanta, GA (US);
Anthony J. Relvas, Ladera Ranch, CA (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/719,677

(22) Filed: Mar. 8, 2010

(65) Prior Publication Data
US 2010/0198709 A1 Aug. 5, 2010

Related U.S. Application Data

(63) Continuation of application No. 12/133,986, filed on Jun. 5, 2008, now Pat. No. 7,702,554, which is a continuation of application No. 11/072,895, filed on Mar. 2, 2005, now Pat. No. 7,398,240.

(51) Int. Cl.
*G06Q 40/10* (2006.01)
(52) U.S. Cl. ........................................ 705/35; 705/36 R
(58) Field of Classification Search ................. 705/36 R, 705/35
See application file for complete search history.

(56) References Cited

U.S. PATENT DOCUMENTS

2004/0215495 A1* 10/2004 Eder ................................. 705/7
2005/0144096 A1* 6/2005 Caramanna et al. ............ 705/30

OTHER PUBLICATIONS

C. Rufus Rorem, Business Value, The Journal of Business of the U. of Chicago, vol. 2, No. 3, Jul. 1929 pp. 312-325.*
Eric Melse, Accounting in three dimensions: a case for momentum, Balance Sheet, vol. 12, issue 1, 2004, 6 pages.*

* cited by examiner

*Primary Examiner* — Kirsten S Apple
*Assistant Examiner* — Abdul Basit
(74) *Attorney, Agent, or Firm* — Brinks Hofer Gilson & Lione

(57) ABSTRACT

A method for assessing the performance of a company is provided. The method may include receiving financial data about the company and determining a future value of the company. Next, the future value is decomposed into a plurality of future value components, where the plurality of future value components includes an economy component that defines an implied amount of growth of the company attributable to the growth of the economy in general. Finally, the method may include displaying at least one of the future value components to advise a user of the performance of the company relative to the economy in general.

24 Claims, 21 Drawing Sheets

Total Return to Shareholders Statement

Assumptions

| | | |
|---|---|---|
| NOPLAT Growth | 10.00% | Targeted growth rate determined by planning process |
| Terminal Growth (GDP) | 3.50% | GDP terminal growth based on historical analysis-US Dept of Commerce |
| WACC | 9.06% | WACC represents the minimum return that must be generated |
| TRS | 10.00% | Targeted return to shareholders; minimum % = WACC |
| Dividends Per Share | $ 0.80 | Dividend payout reduces invested capital = capital returned to shareholders |

Target Input Variables

| | Historical Performance | | | Target | Target Setting Analysis | | |
|---|---|---|---|---|---|---|---|
| Current Value | 2001 | 2002 | 2003 | Target | Variance | Adj Target | Variance |
| Revenue | 10,744 | 11,596 | 13,181 | | 13,181 | 13,181 | 13,181 |
| - COGS (w/o Dep & Amort) | (7,924) | (8,388) | (9,186) | | (9,186) | (9,186) | (9,186) |
| + Operating Lease Expense | 333 | 443 | 499 | | 499 | 499 | 499 |
| - SG&A | (2,045) | (2,259) | (2,816) | | (2,816) | (2,816) | (2,816) |
| - Other Operating Expenses | - | - | - | | - | - | - |
| - Depreciation & Amortization Expense | (249) | (267) | (283) | | (283) | (283) | (283) |
| Adjusted EBIT | 859 | 1,126 | 1,395 | | 1,395 | 1,395 | 1,395 |
| + Amortization Expense | - | 2 | 8 | | 8 | 8 | 8 |
| EBITA | 859 | 1,128 | 1,403 | | 1,403 | 1,403 | 1,403 |
| Marginal Taxes on EBITA | (318) | (417) | (519) | | (519) | (519) | (519) |
| NOPLAT | 541 | 711 | 884 | 782 | 102 | | 884 |
| + Operating Cash | 215 | 232 | 264 | | 264 | 264 | 264 |
| + Accounts Receivables | 339 | 364 | 410 | | 410 | 410 | 410 |
| + Inventory | 1,460 | 1,555 | 1,466 | | 1,466 | 1,466 | 1,466 |
| + Other Current Assets | 210 | 202 | 211 | | 211 | 211 | 211 |
| Operating Current Assets | 2,223 | 2,353 | 2,351 | | 2,351 | 2,351 | 2,351 |
| - Accounts Payable | (935) | (1,092) | (1,111) | | (1,111) | (1,111) | (1,111) |
| - Income Taxes Payable | (212) | (190) | (207) | | (207) | (207) | (207) |
| - Other Current Liabilities | (443) | (566) | (615) | | (615) | (615) | (615) |
| Non-Interest bearing Current Liabilities | (1,591) | (1,848) | (1,933) | | (1,933) | (1,933) | (1,933) |
| + Operating Working Capital | 632 | 506 | 418 | | 418 | 418 | 418 |
| + Net PPE | 1,359 | 1,448 | 1,505 | | 1,505 | 1,505 | 1,505 |
| + Implied Value of Operating Leases | 6,559 | 8,229 | 8,426 | | 8,426 | 8,426 | 8,426 |
| + Other Operating Assets | 106 | 348 | 317 | | 317 | 317 | 317 |
| - Other Operating Liabilities | (86) | (105) | (142) | | (142) | (142) | (142) |
| Invested Capital w/o Goodwill | 8,570 | 10,426 | 10,524 | | 10,524 | 10,524 | 10,524 |
| + Net Goodwill | 780 | 1,757 | 1,752 | | 1,752 | 1,752 | 1,752 |
| Invested Capital w/ Goodwill | 9,350 | 12,184 | 12,276 | 12,587 | (311) | | 12,276 |
| Current Value | 5,239 | 7,846 | 9,974 | 8,631 | (1,343) | | 9,974 |
| Operating Advantage | - | - | - | | - | - | - |
| Financing | | | | | | | |
| Risk Free Rate | 5.03% | 3.96% | 4.33% | 3.96% | 0.37% | | 4.33% |
| Market Risk Premium | 5.00% | 5.00% | 5.00% | 5.00% | - | | 5.00% |
| Beta | 2 | 2 | 2 | 2 | - | (1) | 1.61 |
| Ke (Cost of Equity) | 15.33% | 15.36% | 12.38% | 15.36% | -2.98% | | 12.38% |
| Kd | 6.69% | 5.62% | 5.99% | 5.62% | 0.37% | | 5.99% |
| Tax Rate | 37.0% | 37.0% | 37.0% | 37.0% | - | | 37.00% |
| Market Capitalization | 8,454 | 8,123 | 13,284 | 8,557 | 4,726 | | 13,284 |
| Total Debt | 6,914 | 9,289 | 9,184 | 10,218 | (1,034) | | 9,184 |
| Total Market Value | 15,368 | 17,412 | 22,467 | 18,775 | 3,692 | | 22,467 |
| WACC (Weighted Average Cost of Capital) | 10.33% | 9.06% | 8.86% | 9.06% | -0.19% | | 8.86% |
| Δ in CV due to Tax Rate Δ | | | | | | 212 | 212 |
| Δ in CV due to Capital Structure Δ (WACC) | | 969 | 212 | | 1,131 | | 1,916 |
| Δ in CV due to Operations | | 1,639 | 1,916 | 785 | 0 | | - |
| Change in Current Value Check | | - | - | (0) | | | |

Fig. 5A

|  | Historical Performance | | | Target Setting Analysis | | |
| --- | --- | --- | --- | --- | --- | --- |
| Enterprise Value | | | | | | |
| Enterprise Value | 15,368 | 17,412 | 22,467 | 18,775 | (3,592) | 22,467 |
| Market Value Added | 6,018 | 5,229 | 10,192 | 6,188 | 4,003 | 10,192 |
| Capital Charge | 966 | 1,103 | 1,088 | 1,140 | (52) | 1,088 |
| Economic Profit ($) | (425) | (393) | (204) | (358) | 154 | (204) |
| Return on Invested Capital (%) | 5.79% | 5.83% | 7.20% | 6.21% | 0.99% | 7.20% |
| Future Value | | | | | | |
| Future Value (Economic View displayed) | 10,129 | 9,566 | 12,493 | 10,144 | (2,349) | 12,493 |
| Operating Disadvantage | 6,218 | 7,069 | 3,803 | 6,448 | 2,645 | 3,803 |
| Expected Growth at GDP (as Illustrative Idex) | 2,684 | 4,942 | 6,508 | 5,436 | (1,072) | 6,508 |
| Future Value Premium (FV') | 1,228 | (2,446) | 2,182 | (1,740) | (3,922) | 2,182 |
| Market Benchmark Index Value (S&P 500) | 1,130 | 856 | 1,131 | 886 | 245 | 1,131 |
| Market Benchmark % Return (S&P 500) |  | -24.29% | 32.19% | 3.50% | 28.69% | 32.19% |
| Future Value Indexed (FV') |  | 11,358 | 12,295 | 10,402 | 1,892 | 12,295 |
| Adjusted Future Value of EP (FV' * WACC) |  | 1,029 | 1,090 | 942 | 148 | 1,090 |
| EP + (EP + Adjusted Future Value of RONA) |  | 636 | 886 | 584 | 302 | 886 |
| Total Economic Profit | | | | | | |
| Economic Profit | (425) | (393) | (204) | (358) | 154 | (204) |
| Invested Capital Charge | 966 | 1,103 | 1,088 | 1,140 |  |  |
| Economic Profit of Future Value (EPFV) | 1,047 | 866 | 1,107 | 919 | 189 | 1,107 |
| EP Finance (Dividends,WACC,D/E) | 38 |  |  | 34 | (34) | - |
| Total Economic Profit $ | 1,626 | 1,577 | 1,991 | 1,735 | 257 | 1,991 |
| Total Economic Profit % |  | -3.03% | 26.29% | 10.00% | 16.29% | 26.29% |
| Total Return to Shareholders | | | | | | |
| Common Shares Outstanding | 464 | 473 | 499 | 473 | 26 | 499 |
| Share Price | 18.22 | 17.17 | 26.61 | 18 | 9 | 27 |
| Dividends Paid per share | 1 | - | - | 0.80 | (1) | - |
| TRS ($) attributable to Share Price |  | (331) | 5,160 | 8,557 | (3,397) |  |
| TRS ($) attributable to Dividends |  |  |  | 378 | (378) |  |
| TRS ($) | 8,825 | 8,123 | 13,284 | 8,936 | 4,348 | 13,284 |
| TRS ($) Indexed |  | 9,450 | 17,446 | 9,516 | 7,930 | 17,446 |
| TRS (%) Return attributable to Share Price Δ |  | -5.76% | 54.98% | 5.34% | 49.64% | 54.98% |
| TRS (%) Return attributable to Dividends |  |  |  | 4.66% | 4.66% |  |
| TRS (%) |  | -5.76% | 54.98% | 10.00% | 44.98% | 54.98% |
| TRS (%) Indexed |  | 18.52% | 22.79% | 6.50% | 16.29% | 22.79% |

Fig. 5B

| | 2003 | 2004 | 2005 | 2006 | 2007 | |
|---|---|---|---|---|---|---|
| | TRS% | | | | | |
| | 1.00 | 1.10 | 1.21 | 1.33 | 1.46 | ←—610 |
| | TRS $ (EQUITY + DIVIDENDS) | | | | | |
| | $3,200 | $3,520 | $3,872 | $4,259 | $4,685 | ←—612 |
| | DIVIDENDS | | | | | |
| | $200 | $210 | $221 | $232 | $243 | ←—614 |
| | EQUITY (MV) | | | | | |
| | $3,000 | $3,310 | $3,652 | $4,028 | $4,442 | ←—616 |
| | DEBT | | | | | |
| | $2,000 | $2,207 | $2,434 | $2,685 | $2,961 | ←—618 |
| | ENTERPRISE VALUE (EV) | | | | | |
| | $5,000 | $5,517 | $6,086 | $6,713 | $7,403 | ←—620 |
| | ECONOMIC PROFIT OF CURRENT VALUE (EP OF CV) | | | | | |
| | $750 | $825 | $908 | $998 | $1,098 | ←—622 |
| | FUTURE VALUE (FV) | | | | | |
| | $4,250 | $4,692 | $5,175 | $5,715 | $6,305 | ←—624 |
| | ECONOMIC PROFIT | | | | | |
| | $75 | $83 | $91 | $100 | $110 | ←—626 |
| | ECONOMIC PROFIT OF FUTURE VALUE (EP OF FV) | | | | | |
| | $425 | $469 | $518 | $571 | $631 | ←—628 |
| | TOTAL ECONOMIC PROFIT | | | | | |
| | $500 | $552 | $609 | $671 | $740 | ←—630 |
| | ANNUAL TRS $ CHANGE | | | | | |
| | | $520 | $562 | $608 | $657 | ←—632 |

GROWTH 10% —602

DIVIDEND % 5% —604

DEBT/EQUITY % 40% —606

Fig. 6

FUTURE VALUE ANALYTICS

RELATED APPLICATIONS

This application is a continuation of U.S. patent application Ser. No. 12/133,986, filed Jun. 5, 2008, which is a continuation of U.S. patent application Ser. No. 11/072,895, filed Mar. 2, 2005, all of which are incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright© 2005, Accenture, All Rights Reserved.

BACKGROUND

1. Technical Field

The present invention relates generally to business performance management, and more particularly to a system and method for evaluating a company's performance based on the decomposition and mapping of total return to shareholders.

2. Background Information

Business performance management (BPM), also known as Enterprise performance management (EPM), relates to the execution and monitoring of the performance of various components of a company's business. BPM, sometimes referred to as the next generation of business intelligence (BI), focuses on business processes such as planning and forecasting and helps businesses discover efficient use of their business units, financial, human, and material resources. Typically, BPM systems consolidate data from various sources, and provide functions for querying and analyzing the data and putting the results into practice.

BPM enhances business processes by creating better feedback loops that allow for the continuous, real-time review of information to help identify and eliminate problems before they grow. For example, forecasting capabilities may help the company take corrective action in time to meet earnings projections. BPM may also be useful in risk analysis and predicting outcomes of merger and acquisition scenarios, as well as planning to overcome potential problems.

BPM provides key performance indicators (KPI), also know as performance metrics or variables, that help companies monitor efficiency of projects and employees against operational targets. These metrics/KPI may be used to assess the present state of the business and to prescribe a course of action. For example, BPM systems have been used to analyze: New customers acquired; Status of existing customers; Attrition of customers; Turnover generated by segments of the Customers; Outstanding balances held by segments of customers and terms of payment; Collection of bad debts within customer relationships; Demographic analysis of individuals (potential customers) applying to become customers, and the levels of approval, rejections and pending numbers; Delinquency analysis of customers behind on payments; and Profitability analysis of customers by demographic segments and segmentation of customers by profitability. Regardless of the type of analysis a BPM system may be used for, BPM systems must acquire metric/KPI that is consistent, correct, and timely available.

Despite the great benefits many BPM systems provide, these systems are only as powerful as the metrics/KPI used to benchmark business performance. Unfortunately, there is a disconnect in traditional BPM systems between the financial performance metrics companies use in analyzing business performance and the ability to create and sustain high performance results in their execution over time. This disconnect arises because most companies take an internal approach to evaluating their business performance using performance metrics such as Earnings per Share (EPS), Return on Net Assets (RONA), Earnings Before Interest, Taxes, Depreciation, and Amortization (EBITDA), Return on Investment Capital (ROIC), Economic Value Added (EVA), Cash Flow Return on Investment (CFROI), and the like. These metrics neglect the true drivers of sustainable shareholder value and instead only determine the operating performance for the current operating year. Essentially, these metrics only provide analysis of a company's current value, or the present value of the uniform perpetual earnings on assets currently held by the company.

This disconnect becomes even more apparent when analyzing companies such as biotech companies with a high percentage of future value, or the present value of company opportunities for investments in real assets that will yield more than the normal market rate of return. For example, traditional value management focuses on Net Operating Profit Less Adjusted Taxes (NOPLAT) as the only source of "Return" on Invested Capital. Because high future value firms have little or no NOPLAT, there is no accounting for the value created by these types of companies.

Companies attempt to solve this disconnect through the implementation of major new transactional systems or point solutions to specific problems, such as ERP systems and data warehouses. Although these solutions are good at tracking transactional data, they do not help a company plan for what may occur and track the key drivers to enable decision making. Point solutions are band-aides that don't address the real problem of proactively managing those aspects of business performance that contribute to sustainable shareholder value.

Other companies address the current problems with BPM by implementing a Balanced Scorecard or Executive Dashboard. Exemplary scorecards and dashboards include the Cognos® Metrics Manager and Cognos® Visualizer, provided by Cognos, Inc. of Ottawa, Canada, and the Hyperion Performance Scorecard, provided by Hyperion Solutions Corporation of Sunnyvale, Calif. These solutions attempt to capture the financial and non-financial drivers of value for the company. These solutions typically provide results that are useful and insightful. However, these solutions may not be integrated into the remaining BPM systems utilized by the company, and may not incorporate metrics reflective of the true drivers of shareholder values.

Accordingly, there is a need for software tools and information technology solutions to create an integrated capability to drive BPM strategy and value creation that accurately measures the key drivers of both current and future value from an external perspective as well as detail how these drivers interrelate.

BRIEF SUMMARY

In one aspect, a method for assessing the performance of a company is provided. The method may include receiving financial data about the company and determining a future value of the company. Next, the future value is decomposed into a plurality of future value components, where the plurality of future value components includes an economy component that defines an implied amount of growth of the company attributable to the growth of the economy in general. Finally, the method may include displaying at least one of the future value components to advise a user of the performance of the company relative to the economy in general.

In another embodiment, a computer-implemented method for analyzing the relative performance of a business unit of a company is provided. The method may include: receiving publicly available historical financial data forecast financial data in an electronic readable format about a plurality of business units from a data source and a Gross Domestic Product (GDP) value indicative of the GDP for a country; calculating with a data processor a plurality of ratios of financial performance measures based on the received financial data, wherein at least one of the plurality of performance ratios comprises a decomposition of the future value of a company; selecting a business unit from the plurality of business units and generating a plurality of data points based on the received data and calculated performance measures for the selected business unit; displaying the plurality of data points on a graph; and depicting on the graph an indicia indicative of a GDP breakeven line associated with an implied amount of growth of the companies attributable to the growth of the economy in general and based on the GDP value.

These and other embodiments and aspects of the invention are described with reference to the noted Figures and the below detailed description of the preferred embodiments.

BRIEF DESCRIPTION OF THE DRAWINGS

FIG. 5A is a diagram representative of a computer display of a first part of an exemplary calculation worksheet;

FIG. 5B is a diagram representative of a computer display of second part of an exemplary calculation of Total Economic Profit (TEP);

FIG. 6 is a diagram representative of an TRS calculation using the TEP performance metric;

DETAILED DESCRIPTION OF THE DRAWINGS AND THE PRESENTLY PREFERRED EMBODIMENTS

Figure 1A:
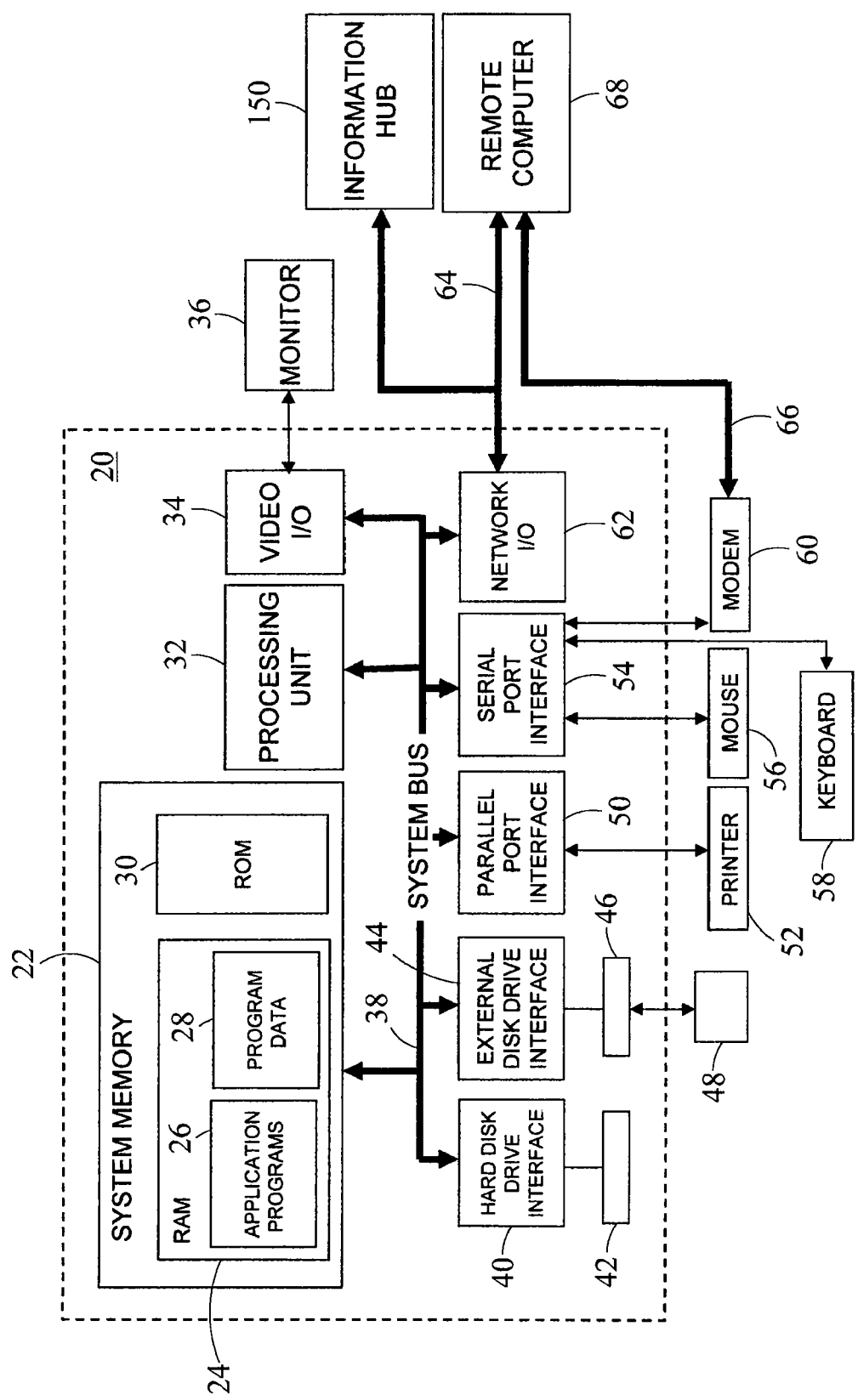
FIG. 1A is a diagram representative of an exemplary system for implementing one embodiment.

Referring now to the drawings, and initially to FIG. 1, an exemplary system for implementing the invention includes a general purpose computing device in the form of a computing environment 20, including a processing unit 32, a system memory 22, and a system bus 38, that couples various system components including the system memory 22 to the processing unit 32. The processing unit 32 may perform arithmetic, logic and/or control operations by accessing system memory 22. The system memory 22 may store information and/or instructions for use in combination with processing unit 32. The system memory 22 may include volatile and non-volatile memory, such as random access memory (RAM) 24 and read only memory (ROM) 30. A basic input/output system (BIOS) containing the basic routines that helps to transfer information between elements within the computer environment 20, such as during start-up, may be stored in ROM 30. The system bus 38 may be any of several types of bus structures including a memory bus or memory controller, a peripheral bus, and a local bus using any of a variety of bus architectures.

The computing environment 20 may further include a hard disk drive 42 for reading from and writing to a hard disk (not shown), and an external disk drive 46 for reading from or writing to a removable external disk 48. The removable disk may be a magnetic disk for a magnetic disk driver or an optical disk such as a CD ROM for an optical disk drive. The hard disk drive 42 and external disk drive 46 are connected to the system bus 38 by a hard disk drive interface 40 and an external disk drive interface 44, respectively. The drives and their associated computer-readable media provide nonvolatile storage of computer readable instructions, data structures, program modules and other data for the computing environment 20. Although the exemplary environment described herein employs a hard disk and an external disk 48, it should be appreciated by those skilled in the art that other types of computer readable media which can store data that is accessible by a computer, such as magnetic cassettes, flash memory cards, random access memories, read only memories, and the like, may also be used in the exemplary operating environment.

A number of program modules may be stored on the hard disk, external disk 48, ROM 30 or RAM 24, including an operating system (not shown), one or more application programs 26, other program modules (not shown), and program data 28. One such application program may include the functionality as detailed below.

A user may enter commands and/or information, as discussed below, into the computing environment 20 through input devices such as mouse 56 and keyboard 58. Other input devices (not shown) may include a microphone (or other sensors), joystick, game pad, scanner, or the like. These and other input devices may be connected to the processing unit 32 through a serial port interface 54 that is coupled to the system bus 38, or may be collected by other interfaces, such as a parallel port interface 50, game port or a universal serial bus (USB). Further, information may be printed using printer 52. The printer 52, and other parallel input/output devices, may be connected to the processing unit 32 through parallel port interface 50. A monitor 36, or other type of display device, is also connected to the system bus 38 via an interface, such as a video input/output 34. In addition to the monitor 36, computing environment 20 may include other peripheral output devices (not shown), such as speakers or other audible output.

The computing environment 20 may communicate with other electronic devices such as remote computer 68. Remote computer 68 may be another computing environment such as a server, router, network PC, peer device, telephone (wired or wireless), personal digital assistant, television, or the like. Remote computer 68 may include many or all of the elements described above relative to the computing environment 20. In one embodiment, the remote computer 68 is a server coupled with a database of historical financial data for a plurality of companies. Herein, the phrase "coupled with" is defined to mean directly connected to or indirectly connected with through one or more intermediate components. Such intermediate components may include both hardware and software based components. Alternatively, or in addition, the remote computer may include accounting and/or financial software for maintaining a company's internal recording keeping.

Figure 1B:
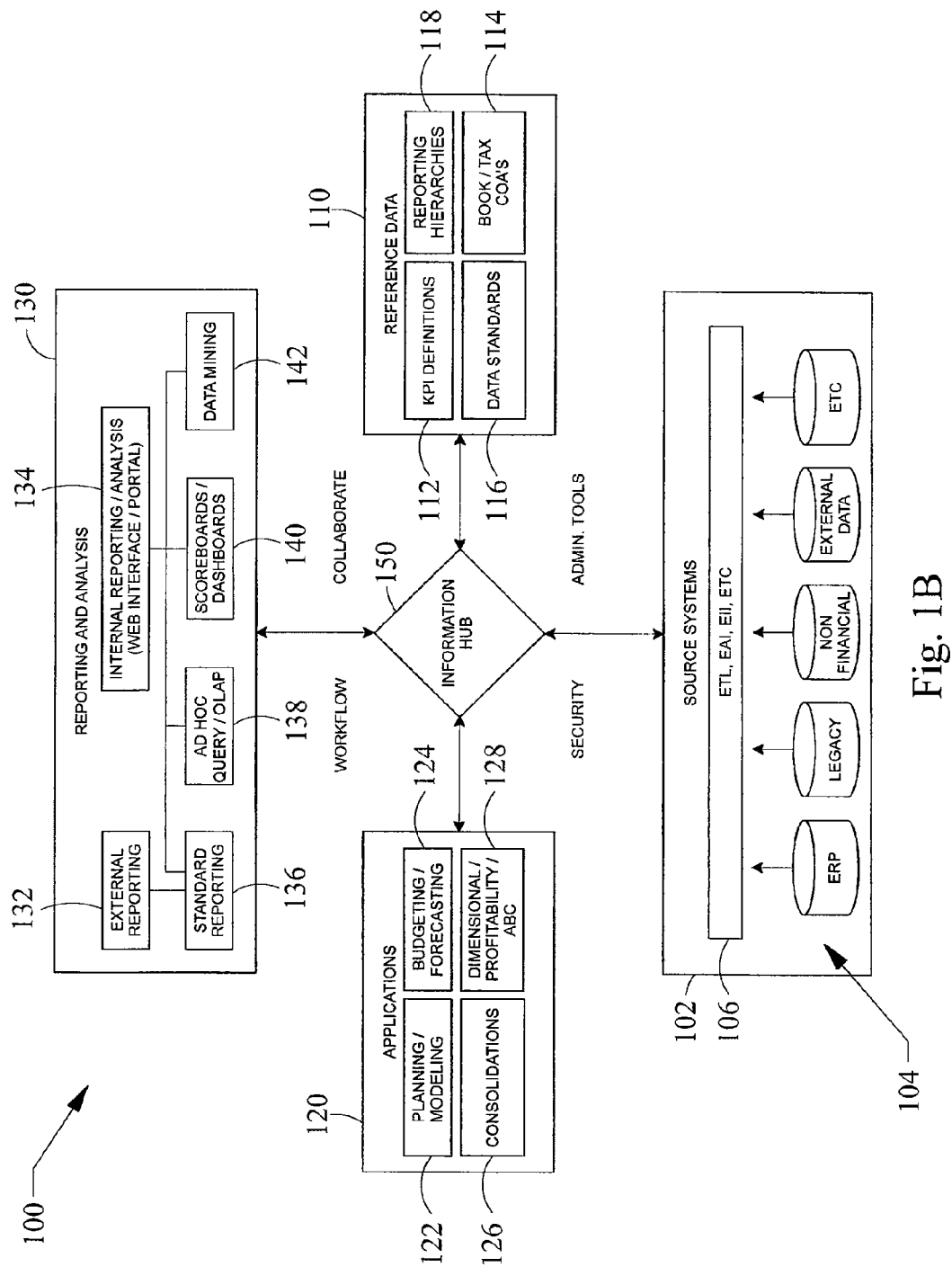
FIG. 1B is a diagram representative of an exemplary architecture for a BPM system.

To communicate, the computer environment 20 may operate in a networked environment using connections (wired, wireless or both wired and wireless) to one or more electronic devices. FIG. 1 depicts the computer environment networked with remote computer 68 and with information hub 150 of a distributed computer system for business performance management, as shown in FIG. 1B. The logical connections depicted in FIG. 1 include a local area network (LAN) 64 and a wide area network (WAN) 66. Such networking environments are commonplace in offices, enterprise-wide computer networks, intranets and the Internet.

When used in a LAN networking environment, the computing environment 20 may be connected to the LAN 64 through a network I/O 62. When used in a WAN networking environment, the computing environment 20 may include a modem 60 or other means for establishing communications over the WAN 66. The modem 60, which may be internal or external to computing environment 20, is connected to the system bus 38 via the serial port interface 54. In a networked environment, program modules depicted relative to the computing environment 20, or portions thereof, may be stored in a remote memory storage device resident on or accessible to remote computer 68. It will be appreciated that the network connections shown are exemplary and other means of establishing a communications link between the electronic devices may be used.

The new business performance management system and method is typically provided as software running on the processing unit 32, resident in the computer-readable medium of the storage device 42, to allow the processing unit 32 to provide the functionalities described herein. As described below, the software may be provided as a spreadsheet, for example as implemented on a spreadsheet program such as Microsoft Excel, however one skilled in the art would realize that the software may be provided as a stand-alone software program (i.e., implemented in any suitable programming language) operating on the processing unit 32 or any operating system provided therewith, and need not utilize any additional software operating on the system. Alternatively, or in addition, the functionalities may be provided as a combination of software and one or more ASICs to provide the functionalities discussed herein.

In further embodiments, as described below, the functionalities may also be provided as a web-based application running on a browser and accessible via the Internet or other communications network. Alternatively, the functionalities disclosed herein may be incorporated into an Executive Dashboard, described above. In yet another embodiment, the functionalities disclosed herein may be provided as a benchmarking service that analyzes historical data for a plurality of companies. The historical data may reside in a remote database, or may be internal to the benchmarking service. The benchmarking service may provide industry specific data and comparative benchmarks for particular industries, or provide general benchmarks that span multiple industries. In one embodiment, the functionalities are embedded into the architecture of a BPM management system via an information hub 150.

An exemplary BPM architecture 100 is shown in FIG. 1B. The architecture 100 may include various source systems 102, reference data 110, applications 120, and reporting and analysis tools 130 integrated by an information hub 150 that may provide support for collaboration of business units, workflow process management, security, and system administration. The source systems 102 may capture information about the company from various data sources 104 via various methods 106. Exemplary data sources 104 may include Enterprise Resource Planning systems (ERP), which are integrated information system that uses packaged software to serve any or all departments within an enterprise. For example, ERP systems may provide software for manufacturing, order entry, accounts receivable and payable, general ledger, purchasing, warehousing, transportation and human resources departments. Additional exemplary data sources 104 may include legacy systems as well as non-financial and external sources of data, and the like. Exemplary methods 106 for managing data from the data sources 104 may include Extraction, Transformation and Loading (ETL), which may be used copy data between databases of different types, Enterprise Application Integration (EAI), which may be used to integrate applications within the company, Enterprise Intelligence Integration (EII, also known as Enterprise Information Integration), which may aggregate disparate sources 104 of business information into a single analyzable body of information, and the like.

The architecture 100 may also include reference data 110 that may define various definitions, standards, and the like. For example, the company may reference certain KPI definitions 112, reporting hierarchies 114, data standards 116, and code of authorities 118. Applications 120 may also be included to provide strategic analysis in areas such as planning/modeling 122, budgeting/forecasting 124, consolidations 126, and dimensional profitability/ABC 128. Finally, reporting and analysis tools 130 may also be provided to present the analytical results to business managers via useful reports, visualizations, and the like. Traditional BPM systems may provide, for example, reporting tools for external reporting 132, internal reporting 134, and standard reporting 136. Additionally, or alternatively, tools may be provided for ad hoc database querying 138, such as OnLine Analytical Processing (OLAP) software that allows the user to quickly analyze information that has been summarized into multidimensional views and hierarchies, executive scoreboards or dashboards 140, data mining tools 142, and the like. It should be apparent to one of ordinary skill in the art, that the source systems 100, reference data 110, applications 120, reporting and analysis tools 140, and information hub 150 capabilities necessary for a particular company may be implementation dependent, and that exact combination of tools provided may vary greatly without departing from the spirit and scope of the present invention.

Figure 2:
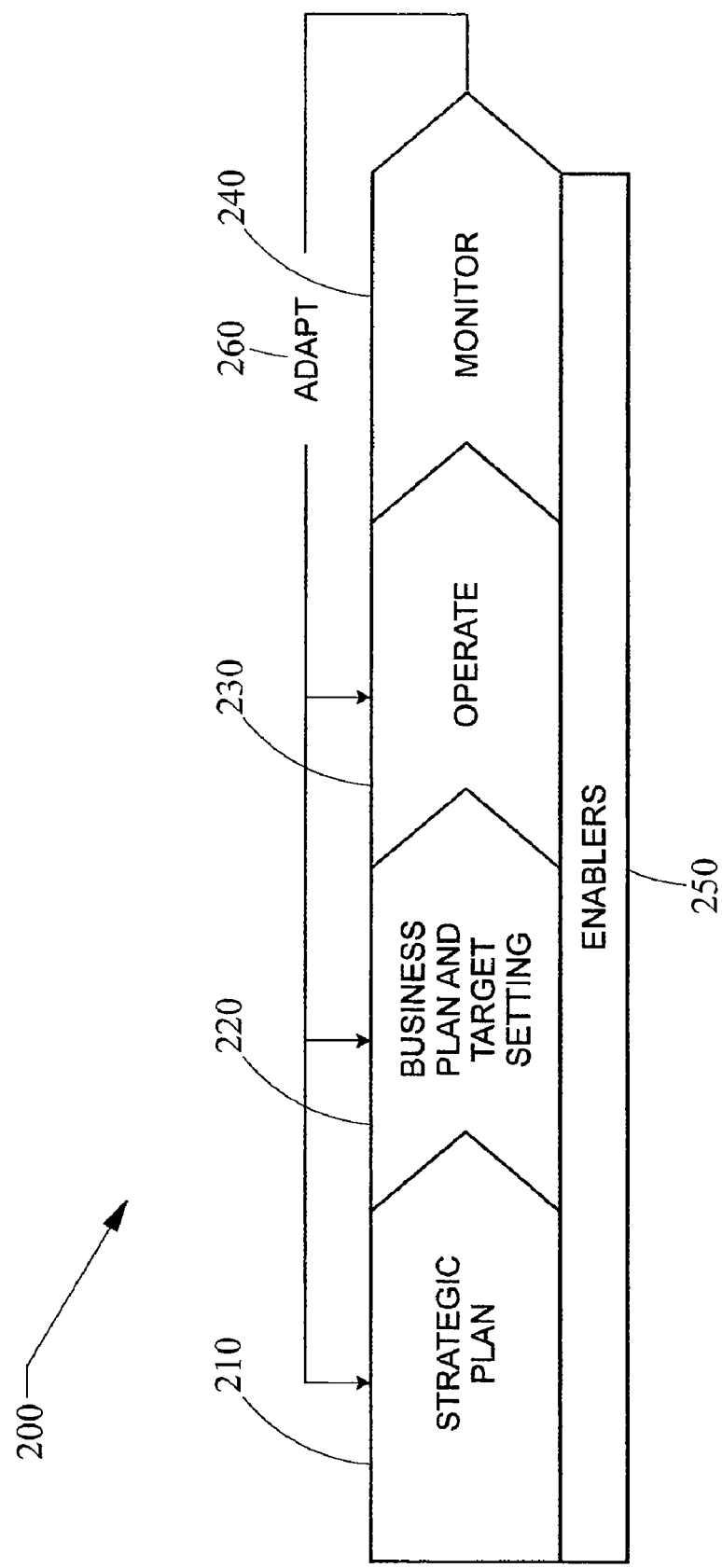
FIG. 2 is a diagram representative of an exemplary EPM technical architecture for implementing one embodiment.

Referring to FIG. 2, an exemplary framework 200 for delivering an integrated BPM system is shown. The framework 200 defines a process to drive strategy through to execution, with results informing periodic adjustments to both long and short term business tactics. The framework includes strategic planning 210, creating a business plan and target setting 220, managing operations 230, monitoring results 240, and enablers 250. The framework 200 also allows each of these areas to adapt 260 as results indicate. Exemplary strategic planning 210 tasks include environmental assessment, competitor assessment, analysis of business opportunities and key capabilities, and long-range financial planning. Exemplary tasks associated with business planning and targeted setting 220 include establishing a direction for products and services, determining the required capabilities, key initiatives, and determining revenue, cost and capital projections as well as budget and operational targets. Exemplary operational 230 tasks include setting operational targets, and managing initiatives, revenues, costs and capital. Exemplary monitoring 240 tasks include analyzing the prior period, forecasting, operational analysis, and dimensional analysis. Exemplary enablers 250 include employee incentives and rewards, and company policies and procedures.

Figure 3:
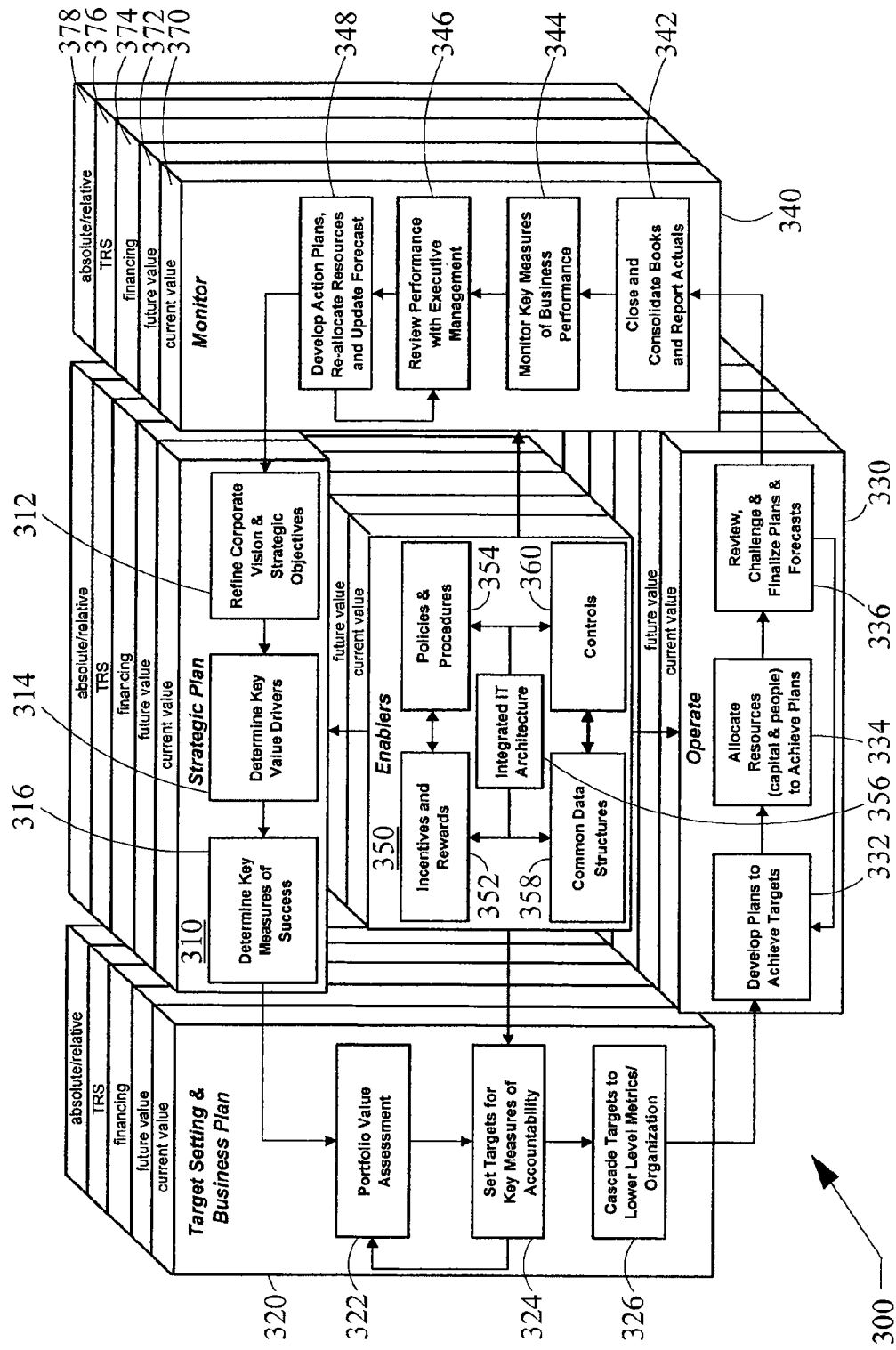
FIG. 3 is a diagram representative of an exemplary framework for delivering an integrated BPM system.

Referring to FIG. 3, an exemplary methodology for implementing the BPM framework of FIG. 2 is shown. As described above, current methodologies focus exclusively on internal performance metrics and current year performance. When utilizing the functionality described below, however, the framework 300 provides a holistic approach to BPM that allows a company to manage business performance across various aspects of its operations and at different levels. For example, a company may want to manage the performance of their business as it effects the company's current value 370, future value 372, financing 374 or TRS value 376, described in more detail below. Alternatively or additionally, the company may wish to see its performance across any of these areas in absolute or relative terms 378, such as raw number analysis, market indices or peer group assessments, respectively. The framework 300 represents the continuous process of strategic planning 310, target setting and business plan development 320, operating 330, and monitoring performance 340 as supported by various enablers 350. An exemplary methodology for strategic planning 310 includes refining corporate vision and strategic objectives 312, determining key value drivers 314, and determining key measures of success 316 activities. The functionalities disclosed herein may find particular use in the strategic planning 310 phase when refining the corporate vision and strategic objectives 312, for example, when analyzing investor expectations, key competitor information and current and future business performance. Similarly, the functionalities disclosed herein may be used to determine the key value drivers 314, for example, by providing a mapping of the value drivers to various performance metrics, and for determining the key measures of success 316, for example, by aligning those measures with shareholder value creation to create cause and effect maps.

An exemplary methodology for target setting and business plan development 320 includes portfolio value assessment 322, set targets for key measures of accountability 324, and cascade targets to lower level metrics/organization 326 activities. As described in more detail below, the functionalities disclosed herein may find particular use in setting targets for key measures of accountability 324, for example, by aligning top down targets with shareholder expectations and ensuring the consistency of external and internal targets. Similarly, the functionalities disclosed herein are ideally suited to cascade the targets to lower level metrics 326.

Exemplary methodology activities for operations 330 include developing plans to achieve the specified targets 332, allocating resources (in terms of both capital and man-power) to achieve all business plans 334, and reviewing, challenging, and finalizing plans and forecasts 336. The functionalities disclosed herein facilitate each of these activities 332, 334, and 336 by providing a clear mapping of target values to business and operational drivers to enable bottom-up resource allocation in line with the established target values.

An exemplary methodology for monitoring performance 340 includes activities for closing and consolidating books and reporting actuals 342, monitoring key measures of business performance 344, reviewing performance with executive management 346, and developing action plans, re-allocating resources and updating forecasts. The functionalities disclosed herein facilitate performance monitoring 340 by providing a consistent system for measuring the performance of the company and a simple user interface to determine exceptions and root causes of poor performance. Coupling these functionalities with a balanced scorecard or executive dashboard, as mentioned above, further enhance these advantages.

Finally, exemplary methodology activities for enablers 350 include establishing, analyzing, and adapting employee incentive and rewards programs 352 and policies and procedures 354, and providing an integrated IT architecture 356, such as the architecture 100 describe above in reference to FIG. 1B, or other software solution projects that utilizes an effective set of common data structures 358 and controls 360.

In order to overcome the disadvantages of the prior art BPM systems, the financial performance metrics used to analyze a company's business performance should take an external view of the company's current and future value. One such external performance metric is the Total Return to Shareholders (TRS), and is defined as the company's equity plus any dividends paid on the stock. TRS can be calculated for a given shareholder by adding dividends to any stock price appreciation and dividing the resultant value by the shareholder's original investment. Coupling the external metric TRS with internal metrics of performance allows the company to see exactly what drives shareholder value.

Figure 4A:
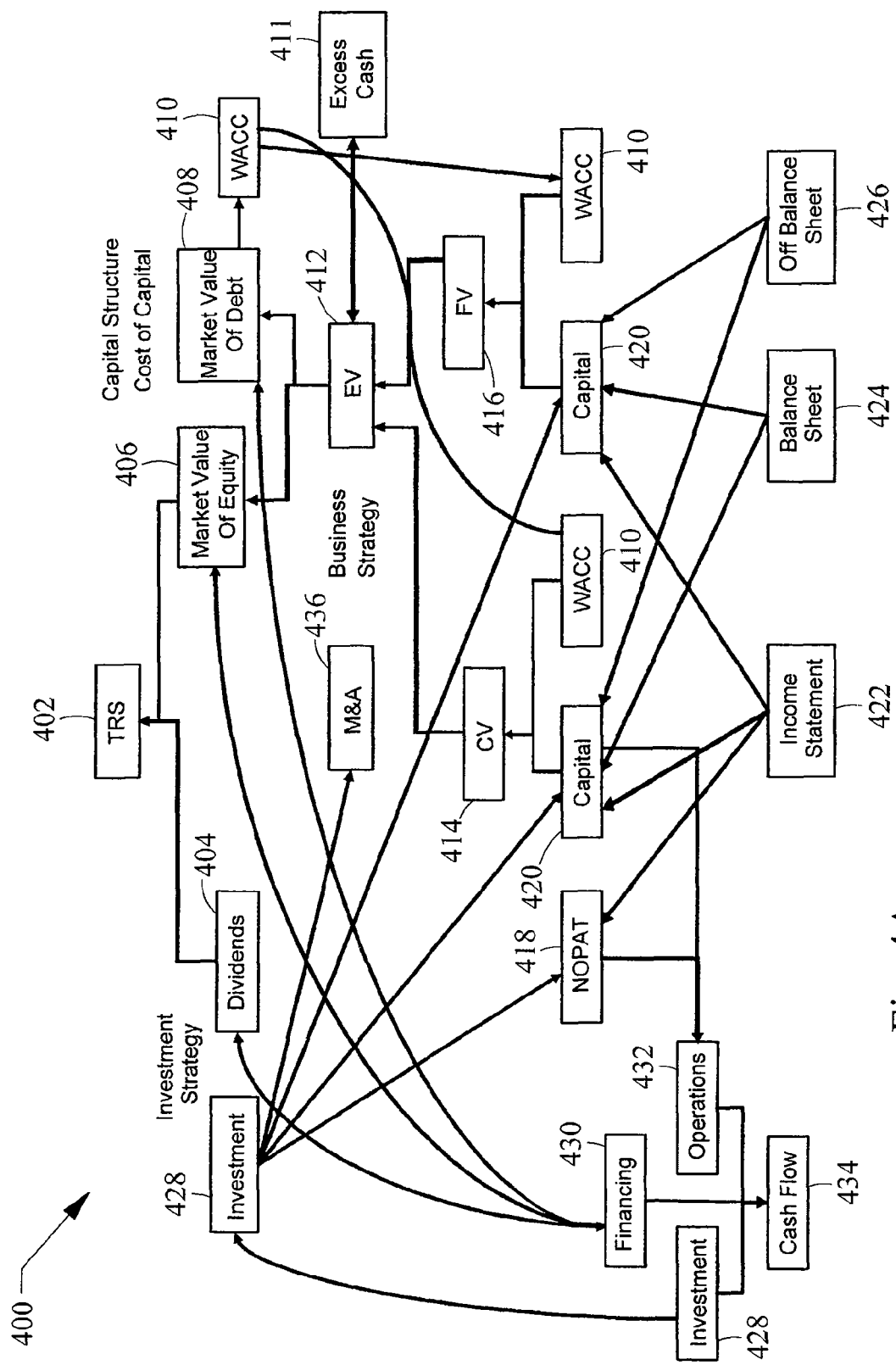
FIG. 4A is a diagram representative of one embodiment of a Total Return to Shareholder (TRS) map depicting exemplary interrelations between internal and external business metrics.

FIG. 4A shows an exemplary flowchart detailing the coupling of TRS with internal performance metrics and the inter-relationships therein, also known as a TRS map 400. As described above, TRS 402 includes dividends 404 paid on the stock as well as the company's market value of equity or MVE 406. MVE 406 can be calculated by shares outstanding times share price. A company's debt 408 to equity structure influences its Weighted Average Cost of Capital 410 (WACC). The total market value of the company (MV) may be defined as the MVE 406 plus the market value of the debt 408.

Enterprise Value (EV) 412 (EV=MV less excess cash 411) can be decomposed into Current Value 414 (CV) and Future Value 416 (FV). The CV 414 represents the current value of the company. The CV 414 is influenced by the company's Net Operating Profits Less Adjusted Taxes 418 (NOPLAT), capital 420, and WACC 410, and can be calculated by dividing the NOPLAT 418 by the WACC 410 (which is also equal to Capital 420+EP/WACC 410), such that CV 414=NOPLAT 418/WACC 410=Capital 420+EP/WACC 410. The FV 416 represents the future value of the company, or the difference between the EV 412 and the CV 414. The FV 416 is influenced by capital 420 and the WACC 410, and can be calculated by subtracting the CV 414 from the EV 412, such that FV=EV−CV. As further detail in FIG. 4A, the capital 420 includes both balance sheet 424 and off-balance sheet 426 components. Additionally, income 422 may influence capital 420 as well as the NOPLAT 418.

The data underpinning these performance metrics also have an effect on the cash flow 434 of the company. Cash flow 434 is determined by the investments 428 made in the company, any financing arrangements 430, as well as operations 432 results. The operations 432 results are influenced by the NOPLAT 418 and the capital 420. Financing arrangements 430 influence the equity 406 of the company, its debt 408, and the ability of the company to pay dividends 404. This may affect the decision of investors to make an investment 428 in the company, which may affect the NOPLAT 418, capital 420 and Mergers and Acquisitions 436 (M & A) of the company.

Figure 4B:
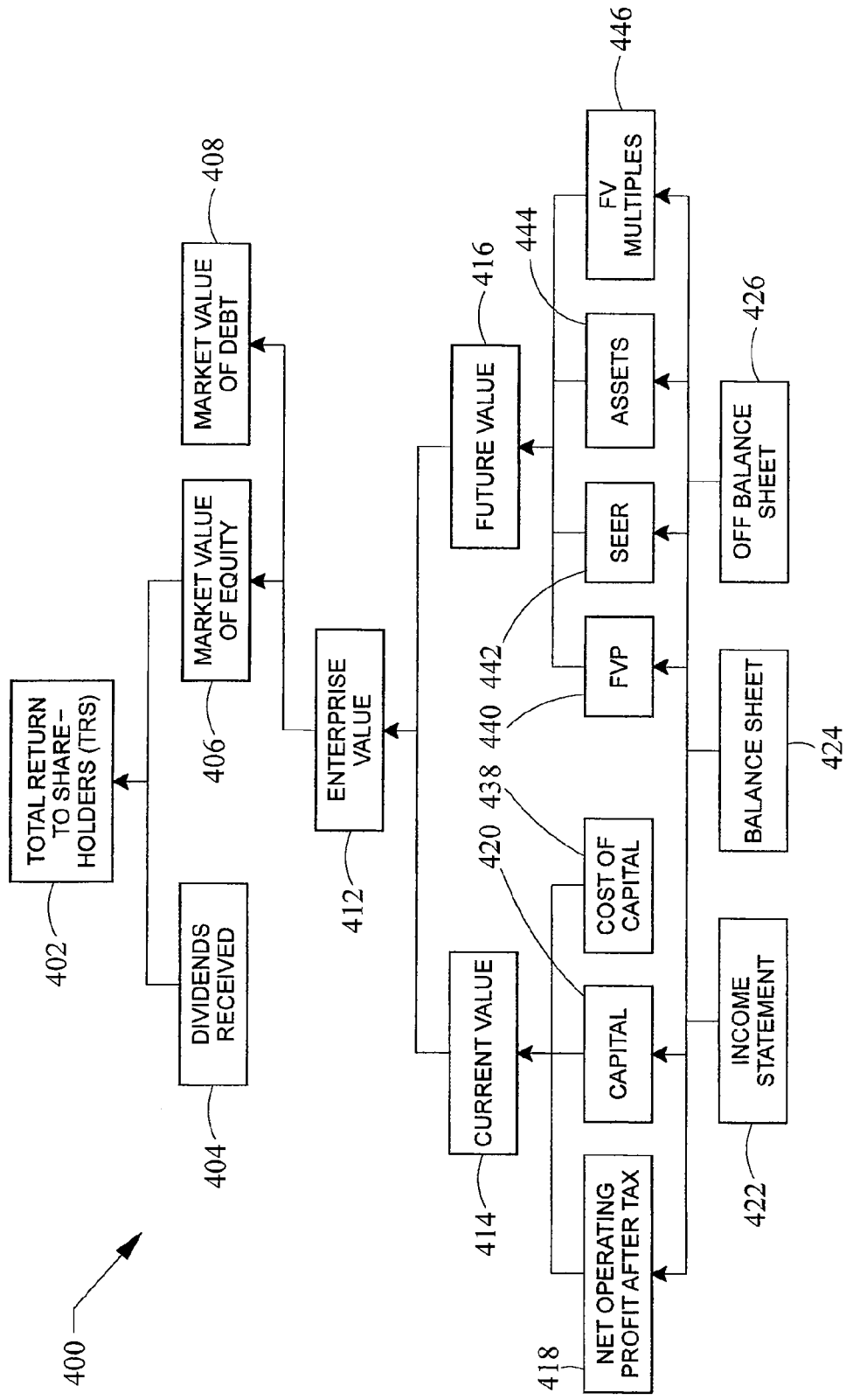
FIG. 4B is a diagram representative of a second embodiment of a TRS map depicting exemplary interrelations between internal and external business metrics.

FIG. 4B depicts an alternative embodiment of the TRS map 400. In the embodiment of FIG. 4B, the FV 416 may be further broken down into component parts via a variety of methods, each of which attempt to define the true drivers of FV 416. For example, one may use an FV premium 440 methodology to determine a company's FV 416 growth relative to the growth of the economy (segment or index) generally. In one embodiment, the FV premium methodology 440 may decompose the FV 416 value into three components: a first component that represents an operating advantage/disadvantage for the company; a second component that defines a projected rate of growth for the economy in general; and a third component that defines the remainder of FV 416 in the company.

In the FV premium methodology 440, the first component may represent an operating advantage/disadvantage for the company. This component may define whether the company is creating or destroying value in the current period, and may be calculated, for example, by calculating a company's economic profit (EP) capitalized (EP/WACC). As described in more detail below, EP may be calculated as a company's NOPLAT less a capital charge for the company, where the capital charge may be defined as a company's invested capital times a WACC for the company, such that EP=NOPLAT−(Invested Capital*WACC). If this value is negative, the company is operating at a disadvantage and is destroying the value of capital entrusted to the company. If this value is positive, the company is operating at an advantage and has generated a premium over the value of capital that is embedded in the company's CV 414. This first component thus defines the portion of FV 416 explained by investor's expected improvement to breakeven EP.

The second component of the FV premium methodology 440 may define an implied growth of the economy in general. It should be apparent to one of ordinary skill in the art that this component may also define an implied growth rate for a particular market, market segment, industry, peer group, and the like. Additionally, this component may be determined using a variety of methods, each of which may be dependent on the market, market segment, etc. being analyzed. In one embodiment, the second component may represent an implied growth in the economy as determined by a terminal value calculation based on the US Gross Domestic Product (GDP). Typically, the terminal value of a perpetually growing firm may be defined as the Free Cash Flow of a company for the next period divided by WACC minus a terminal growth rate, or $FCF_{t+1}/(WACC-g)$. By substituting a breakeven NOPLAT value, or the point at which zero EP is being generated, for the Free Cash Flow of the company ($FTF_{t+1}$) and the historical growth rate of the US GDP for the terminal growth rate (g), one can determine that portion of a company's FV 416 implied by the growth rate of the economy. In one embodiment, the breakeven NOPLAT may be defined as a company's invested capital times WACC, such that the portion of a company's FV 416 attributable to the implied growth of the economy may be calculated by the following equation: (Invested Capital*WACC)/(WACC−g). An exemplary growth rate for the US GDP is 3.41%, adjusted for inflation.

The third component, or the FV premium component, of the FV premium methodology 440 includes the remainder of any FV 416 not explained by the first two components, or the FV 416 of the company minus that portion of FV 416 explained by the implied growth of economy minus any FV 416 explained by an operating disadvantage. For companies operating at an advantage, the FV premium component may be defined as the FV 416 of the company minus that portion of FV 416 explained by the implied growth of economy. A positive FV premium component indicates that the company is outperforming the economy, market sector, industry, or the like, while a negative FV premium component indicates a growth rate below what is to be expected. Various visualizations incorporating the algorithms and components of the FV premium methodology 440 are described in more detail below in reference to FIGS. 7-17.

Alternatively, or additionally, other methodologies may be used to further analyze the FV 416 of a company. Exemplary methodologies include a SEER© methodology 442 that defines the drivers of FV 416, an asset methodology 444 that breaks down FV 416 by each company asset that drives FV 416, and an FV multiples methodology that analyzes a companies investments in the drivers of FV 416 to suggest investment strategies that may maximize FV 416. Each of these methodologies is described in more detail in U.S. patent application Ser. No. 11/072,351 entitled "Future Value Drivers," to John J. Ballow et al., filed on Mar. 2, 2005, and issued as U.S. Pat. No. 7,778,910 on Aug. 17, 2010, the entire disclosure of which is hereby incorporated by reference.

Figure 4C:
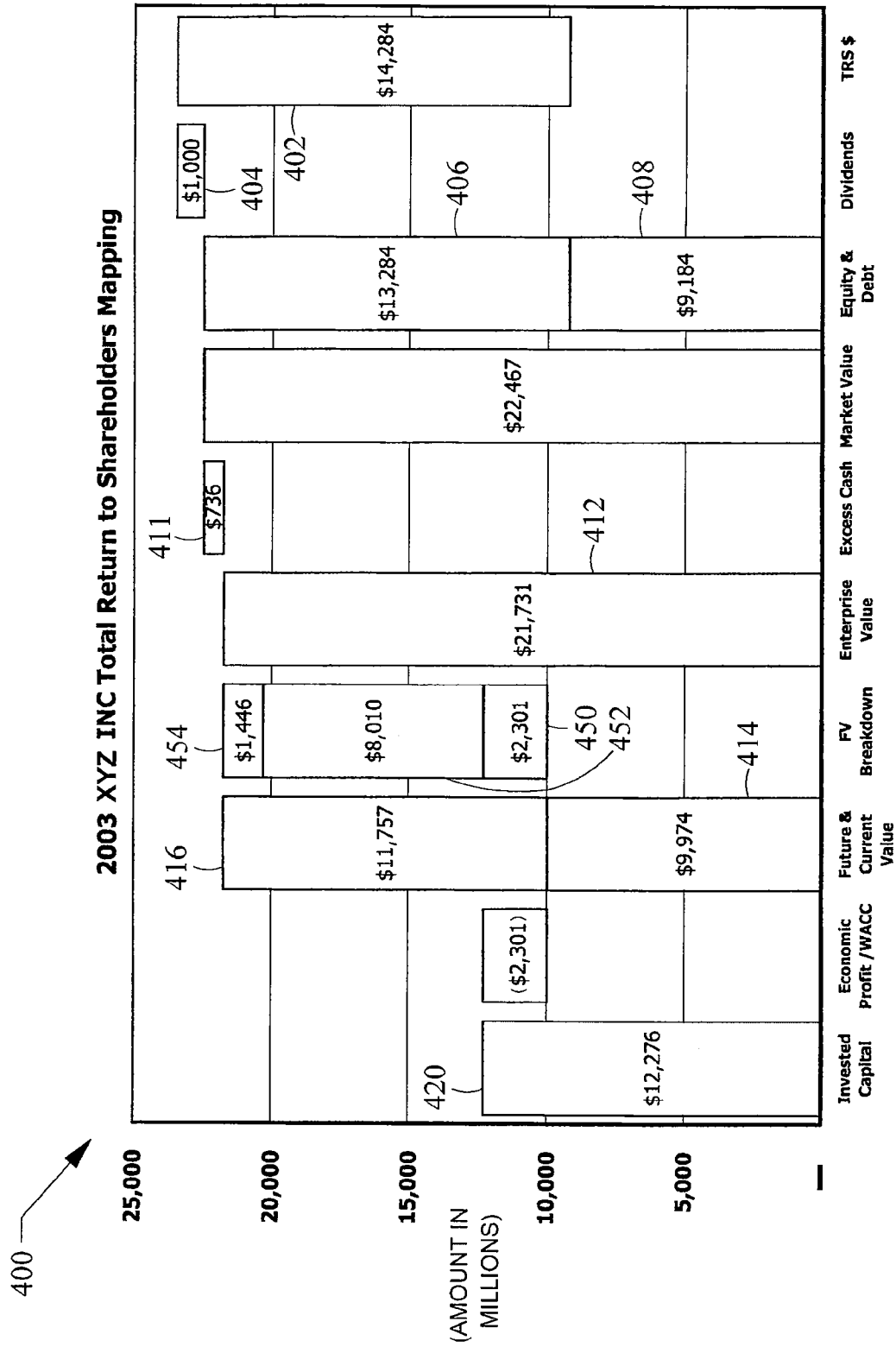
FIG. 4C is a diagram representative of a third embodiment of a TRS map depicting exemplary interrelations between internal and external business metrics.

Referring now to FIG. 4C, an exemplary visualization for displaying a TRS map 400 is shown. In the embodiment of FIG. 4C, a bar graph is used to visually convey the various components of a TRS map 400 to a user, and may be used to explain the TRS 402 for a particular period of time. For example, assume a company had a TRS 402 of $14,284 for a given period while paying $1000 in dividends 404 over that same period, resulting in a market value of equity 406 equal to $13,284. Further assuming a market value of debt 408 for the company of $9,184, the total market value of the company may be calculated at $22,467. Subtracting any excess cash 411 for the period leaves an enterprise value 412 of $21,731. If the company has an invested capital 420 of $12,276 and EP/WACC of ($2301), it can be calculated that the company's equity value 412 includes $9,974 of CV 414 and $11,757 of FV 416. Using the FV premium methodology 440, one can determine that the various components of FV 416 include a first portion 450 of $2,301 based on the expectation that the company will reach a breakeven economic profit, a second portion 452 of $8,010 based on an expected growth of the economy generally, and a third portion 454 of $1,446 which represents an expectation that the growth of the company will exceed that of the economy.

In FIGS. 5A-B, an exemplary TRS statement detailing a Total Economic Profit (TEP) 510 calculation is shown. TEP represents one metric for annualizing and managing current and future value that bridges the gap between internal performance metrics and external metrics such as TRS. The TEP 510 of a company may be defined to include economic profit portions attributable to the current year, future value, capital charges, financing, and the like, or any combination thereof. The TEP 510 may be calculated for a given year, such as for tracking historical performance 520 of a company, or may be calculated for the enterprise as a whole. Additionally, change percentages 522 for the TEP may also be calculated. In one embodiment, the TEP 510 may also be used for target setting 530, described in more detail in U.S. patent application Ser. No. 11/072,566 entitled "TRS Target Setting," to John J. Ballow et al., filed on Mar. 2, 2005, and issued as U.S. Pat. No. 7,899,735 on Mar. 1, 2011, the entire disclosure of which is hereby incorporated by reference. In the embodiment of FIGS. 5A-B, the TEP 510 is calculated by adding an EP 502 component, an invested capital charge 504, an EP of FV component 504, and an EP of financing component 504. The EP 502 component defines economic profit for the current value of the company for the given period, and may be calculated by multiplying the invested capital 540 of a company by its WACC 542 and subtracting the resultant value from company's NOPLAT 544. The invested capital charge 504 may be calculated by multiplying the company's invested capital 540 by the company's WACC 542. The Economic Profit of Future Value (EP of FV) 506 represents the economic profit of future value component 510 and may be calculated by multiplying the FV 546 of the company by its WACC 542. Optionally, the EP of finance 508 represents the portion of EP attributable to the company's financing arrangements. In one embodiment, the EP of finance 508 may be calculated by multiplying the dividends 548 paid for the period by the total number of outstanding shares 550 and dividing the resultant value by the company's WACC 542, such that the EP of finance 508 =(Dividends per Share*Outstanding Shares) *WACC/WACC. Finally, the TEP 510 is calculated by adding the EP of CV 502, the capital charge 504, the EP of FV 506, and the EP of finance 510, so that the a capitalized change in TEP for a given period is equal to the TRS for that period.

The TEP can then be used to calculate the TRS for a given year. The TRS change for a given period can be calculated in dollars by calculating the change in TEP for the period (TEP at the end of the period minus TEP at the beginning of the period) and dividing the result by the WACC. Next, any change in debt is subtracted from the resultant value, and finally the dividends are added, such that the TEP ($)= (TEP2−TEP1)/WACC−Change in Debt+Dividends.

These calculations may also be represented as follows:

$$TRS\$ = MV2 - MV1 + \text{Dividends} \quad \text{(Eq. 1)}$$

$$TRS\% = (MV2 - MV1 + \text{Dividends})/MV1 * 100 \quad \text{(Eq. 2)}$$

Where $MV2$ is the market value of equity at the end of the period,
$MV1$ is the market value of equity at the beginning of the period and dividends are issued during the period.

$$EP = NOPLAT - (\text{Capital} * WACC) = EP \text{ of } CV \quad \text{(Eq. 3)}$$

$$CV = NOPLAT/WACC = \text{Capital} + EP/WACC \quad \text{(Eq. 4)}$$

$$MV = \quad \text{(Eq. 5)}$$
$$\text{Equity} + \text{Debt} = EV + \text{excess cash} = cv + fv + \text{excess cash}$$

$$EV = \text{equity} + \text{Debt} - \text{excess cash} = mv - \text{excess cash} \quad \text{(Eq. 6)}$$

$$FV = EV - CV \quad \text{(Eq. 7)}$$
$$= \text{Equity} + \text{Debt} - EP/WACC - \text{capital} - \text{excess cash}$$
$$= \text{Equity} + \text{Debt} - NOPLAT/WACC - \text{excess cash}$$

$$EP \text{ of } FV = FV * WACC \text{ (Decapitalizing Future Value)} \quad \text{(Eq. 8)}$$

$$TEP = \quad \text{(Eq. 9)}$$
$$\text{Capital} * Wacc + EP \text{ of } CV + EP \text{ of } FV + EP \text{ of Financing}$$

$$TRS = (TEP2/WACC2 - TEP1/WACC1) - 1 \quad \text{(Eq. 10)}$$

Using annual TRS calculations allows a company to set target TRS values and decompose the TRS target (or shareholder expected returns) into values for Operating Capital and performance (CV), Growth (FV), and Financing. These additional values can then be further broken down, as described below. Indexing can be used to show performance in absolute and relative terms.

An exemplary TRS target worksheet using the TEP metric is shown in FIG. 6. Although the exemplary TRS worksheet of FIG. 6 contemplates TRS target setting, it should be apparent to one of ordinary skill in the art that a similar worksheet could be used to track historical performance of a company's TRS as well. Initially, a desired growth rate 602, dividend payment percentage 604, and debt/equity ratio 606 are established. In the example of FIG. 6, the company desires a ten percent growth rate 602, a five percent dividend payment 604, and a debt/equity ratio 606 of forty percent. Target TRS percentage changes 610 are then established for each of the desired year based on the growth percentage 602. Next, the TRS percentage changes 610 are converted to TRS dollar amount changes 612 for each year. The dividend targets 614 are calculated based on the desired dividend rate 604. Finally, the equity 616 and debt 618 values are calculated as a function of the desired debt/equity ratio 606. As the cost of equity (ke) is embedded in the WACC, setting a TRS target=ke assures meeting investor expectations ie. equity growth at ke.

From these values, the equations described above can be used to establish target values for additional performance metrics. These include targets for EV 620, EP of CV 622, FV 624, EP 626, EP of FV 628, and TEP 630. Finally, the annual TRS dollar change 632 can be calculated as a function of the TEP targets 630 to verify the calculations. These targets can then be decomposed further into targets for the drivers of each of these metrics to help the company reach these targets.

As noted above, the decomposition and mapping of the current and future value components of the total return to shareholders along with associated business processes or business components that drive those values provides valuable software tools for use in analyzing business performance and in managing the operation of those business components. As used herein, a business component may be an organizational sub-division of a company or enterprise. A business component also may be a business process within an enterprise that may be analyzed as an independent operation from a financial perspective.

In one embodiment, for example, a software tool may be provided on a laptop computer for use by a business consultant. In person-to-person interviews with a client, financial data may be input into a computer having a spreadsheet programmed to perform the calculations noted above. The spreadsheet may execute the calculations and presently generate reports on the display of the laptop for review by the consultant and client. The decomposition of shareholder value into component parts may displayed in graphical hierarchical maps that provide powerful depictions of hypothetical scenarios of the effect that drivers of business components have on current and future enterprise values.

In another embodiment, the program executing the calculations may be resident on computer-readable medium in a server in communication with a privately accessible data communication network, such as the internet or a WAN. The program may be accessed through a computer having a browser based interface to implement the same scenario identified above, or scenarios identified below.

Using the above spreadsheet or similarly programmed software tool implementing the method of this invention, one may quickly identify business component values that under perform industry benchmarks or corporate targets. The identified components may be candidates for further analysis to determine whether technology solutions may be provided to raise performance standards and enhance shareholder value. The spreadsheet or other software tool may include a library of standard technology solutions associated with each business component. Such solutions may be displayed or included in a report generated that describes the identified underperforming component and solutions that require further analysis for implementation to achieve benchmark or other target performance.

In yet another embodiment, the invention may be implemented in an enterprise as part of the business management software. A computer in communication with the financial accounting system may import financial data representative of the performance of a plurality of business components. The financial data may be manipulated to correspond with business components according to a map of business components identified as driving current or future value of shareholder returns. The financial data may then be analyzed in accordance with this invention to determine and display the expected actual shareholder return driven by the actual performance. Such data may be graphically displayed in a hierarchical map, or in the form of an executive dashboard. The actual performance financial data may be displayed along side with target values for various business component values. Colors, such as green, yellow, or red, for example, may be used to identify the relative performance, such as above, below, or greatly below target values assigned to individual business components. Additionally, acceptable tolerances for each business component target value may be established and reflected in the display. Such tools may be useful when integrated as monitoring tools into the business performance management frameworks, such as described in association with FIGS. 2 and 3.

In still another embodiment, the invention may be implemented in the form of a financial data provider. A database containing a historical store of financial data of corporation may be in communication on a publicly accessible network. For a fee, financial analysts may access such data and, using the software tools with on their own systems or on a server dedicated to this database, the financial analysts may map the components of shareholder value across broad swaths of industry segments. Also, the financial analysts may focus on a specific industry to determine industry benchmarks of component values. Those component benchmarks may be applied to generate financial report maps used for comparison purposes in making investment decisions with a specific company. Alternatively, the benchmarks may be used for comparison to identify which business components within a company are underperforming competitors, to enable business mangers to determine which business components require additional resources to maintain competitive performance levels.

In an alternative embodiment, the invention may be implemented in the form of target setting, forecasting, and budgeting tools in which targets are selected at a high level of management through a process of strategic planning to select targets based on a combination of value, such as TRS value for example, expected to be added and manageability of the candidate targets. In one embodiment, computer simulations of, inter alia, increased cash flows expected by the target strategies. These targets may then be flowed down to the various levels of management, budgets may be constructed around those target strategies, and the budgets may be consolidated and flowed upward. Alternatively, or additionally, the system may be used to increase shareholder value by improving forecasting abilities through the use of graphical representations of performance metrics of similarly situated companies in order to identify realistic value enhancing business strategies as goals for the organization. Exemplary systems of these types include those described in U.S. Patent Publication Nos. 2004/0073441 A1 and 2004/0073477 A1, both to Heyns et al., the entire disclosures of which are hereby incorporated by reference.

In still another embodiment, the invention may be implemented in a system for automatically examining a company's financial data and evaluating factors affecting the company's stock value. The system may, for example, evaluate a company's spread through that company's debt and equity costs and measure returns to investors from company growth, which may be either organic growth or growth through mergers and acquisitions. The system may also evaluate the financial data of other publicly traded companies, such as those in the same industry, and compares the various factors affecting stock value. The system may also include tools for determining the return to investors, such as a software-based application that collects receives financial data and uses this information to calculate the return to inventor through the company's spreads and growth. An exemplary systems of these types include those described in U.S. Patent Publication Nos. 2005/0004832 A1, to Ostergard et al., the entire disclosure of which is hereby incorporated by reference.

Another aspect of the invention provides comprehensive performance analysis of a company's FV, and is illustrated in FIGS. 7-17. This embodiment includes a dynamic competitive modeling tool that allows one to interactively analyze a company's business strategy. The tool is suitable for analyzing the strategic environment of a company or business unit by graphically depicting the historical and forecasted performance of a company relative to its peers. Preferably the tool includes a financial model of a company's performance based on the algorithms and components of the FV premium methodology 440 described above. By using the FV premium methodology 440 algorithms, on the one hand, the tool can provide meaningful analysis of FV across an entire industry to enable a company's management to wisely select a plan keeping FV performance in mind. On the other hand, since the tool relies on publicly reported financial data, the tool can be used by outside analysts to benchmark a company's FV performance for evaluating investment decisions.

The tool may also display a company's historical performance metrics and may embed interactive inputs to permit a user to select any financial metrics indicative of a company's operational and strategic planning the user wishes to view. As a default, published forecasts may be used as the starting point for the analysis. These historical metrics are dynamically tied into the powerful visualization tools to graphically depict multiple key performance measures, such as FV premium. The tool has the capability to graphically depict the performance of selected peer companies on the same chart to provide a graphical comparison of FV performance among industry peers.

Figure 7:
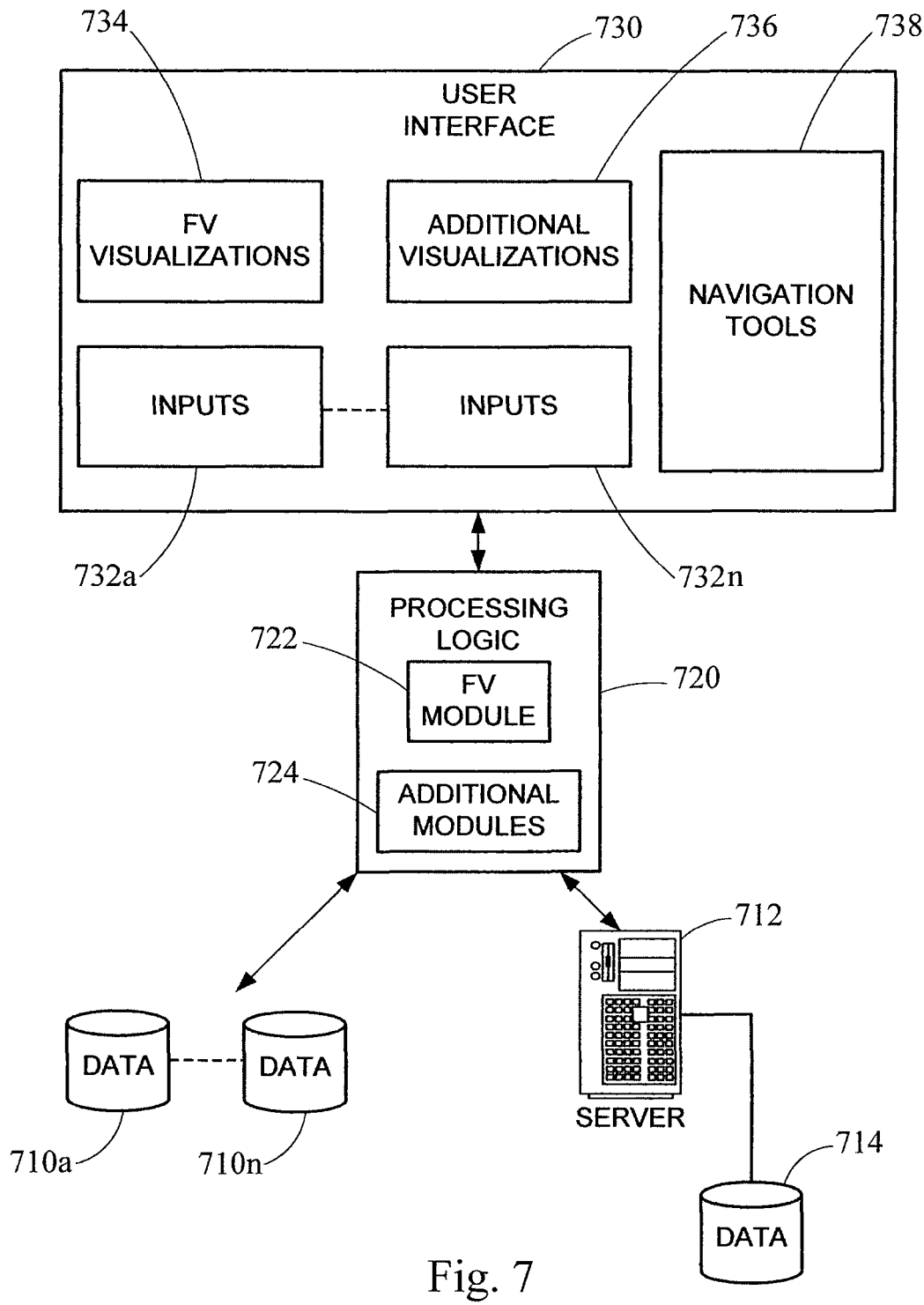
FIG. 7 is an exemplary comprehensive performance analysis tool.

As shown in FIG. 7, the system 700 may include a plurality of data sources 710a-710n containing financial information, processing logic 720 for determining various performance metrics and information from the financial data, and a user interface 730 for collecting operator inputs 732a-732n and displaying various information, such as FV visualizations 734, customizable visualizations 736, and the like. Each of these components may be provided individually, or in combination with one another. The user interface 730 may also include navigation tools 738 for navigating among the various components of the interface 730, updating or refreshing the visualizations 734 and 736, and the like.

The system may include a server 712 at a financial data provider with a large data store 714 of the reported financial data and prices of publicly traded financial instruments of publicly traded companies in one embodiment. Preferably, the data store contains historical data that may be provided or sold to others. The server 712 may be connected to a publicly accessible distributed data network, such as the Internet. Communications with the processing logic 720 may occur over such a network.

Processing logic 720, which may be maintained by a publicly traded company, is in communication with either the data sources 710a-710n, the server 712, or a combination of data sources 710 and servers 712. The processing logic 720 may be implemented as either software or hardware on a single computer or across multiple computers. The processing logic 720 may be in communication with a database 710 containing the companies' current and historical accounting and financial data. The processing logic 720 may also include modules for determining various performance metrics for a business unit associated with the company, such as an FV module 722. The business units may include any component of the company for which financial data may be segregated, such as departments, subsidiaries, product lines, geographical regions, product SKUs and the like. In one embodiment, the business units may also include similar information for a competitor of the company, such as industry peers. Optionally or alternatively, the server 712 may be maintained by private investment analysts firms that analyze publicly traded companies and provide investment recommendations for private investors or the public. In such an embodiment, conventional periodic corporate financial reports may be obtained by the processing logic 720 from those servers 712.

The processing logic 720 may be configured to determine various performance metrics and information from the financial information. Such determinations may include calculations based on the received financial information as well as selecting metrics or information included in the received financial information. Alternatively, or in addition, the processing logic may be configured to project performance metrics and information from historical information (such as databases of historical information, annual reports, and the like), user inputs 732a-732n, or any combination therein. In one embodiment, the processing logic 720 may be implemented as a series of modules for the individual performance metrics. Alternatively, each module may be configured to calculate multiple metrics. In the embodiment of FIG. 7, the processing logic 720 includes an FV module 722 for analyzing the FV of a company in accordance with the FV premium methodology 440 discussed above in reference to FIG. 4B. Preferably, the FV module 722 is configured to calculate each of the three components of the FV premium methodology 440, an operating advantage component, a general economy growth rate component, and an FV premium component, from historic data for each of a plurality of companies, business units, and the like. Alternatively, the algorithms of the FV premium methodology 440 may be implemented across multiple modules. Alternatively, or additionally, additional modules 724 may be provided to calculate additional performance metrics of a company. Table 1.0 includes performance metrics and information which may be determined by the processing logic 720.

TABLE 1.0

Beta
Risk Free Rate
Market Risk Premium
Ke
Kd
Debt/Equity Ratio
WACC
NOPLAT
NOPLAT (Cash Tax Rate)
Invested Capital (w/o Goodwill)
Invested Capital w/Goodwill
Capital Charge
Economic Profit
Market Value Added
Current Value
Current Value %
Current Value w/o Excess Cash
Current Value w/o Excess Cash %
Future Value
Future Value %
Future Value w/o Excess Cash
Future Value w/o Excess Cash %
Enterprise Value
Enterprise Value w/o Excess Cash
Market Capitalization
Total Debt
Total Value
Total Investor Fund
Book Value
Revenue
Revenue Growth (Year over Year)
Simple Avg of YOY Rev Growth
Revenue Growth CAGR (Present Back to Year X + 1)
Revenue per Employee
Year over Year Growth
COGS (w/o Depreciation & Amortization)
COGS Margin
Gross Margin (D&A not included in COGS)
Gross Income
SG&A
SG&A Margin
EBITA
Marginal Taxes on EBITA
EBITDA Margin
Operating Lease Expense
Other Operating Expenses
Non-Operating Expense, Net
Retirement Expenses
Retirement Related Liabilities (RLL) Expense
Depreciation & Amortization Expense
Depreciation Margin
Amortization Expense
Amortization Margin
Interest Expense
After Tax Interest Expense
Interest Income
Interest Income after taxes
Interest Coverage Ratio
Adjusted EBIT
EBIT Margin
Reported Net Income
Cash Tax Rate on EBITA
Cash Taxes on EBITA
Deferred Taxes
Change in Deferred Taxes
Extraordinary Items
Minority Interest TABLE 1.0-continued Adjusted Net Income
Tax Rate
After Tax Non-Operating Income
After Tax Op Leases
After Tax Retirement Related Liabilities (RLL)
Tax on Interest Income
Tax on non-operating Income
Tax on Operating Leases
Tax Shield on Interest Expense
Tax Shield on Retirement-related Liabilities
Operating Cash
Excess Cash and Securities
Accounts Receivables
Operating Current Assets
Other Operating Assets
Other Current Assets
Operating Working Capital
Inventory
Non-Operating Investments
Net PPE
Net Goodwill
Cumulative Goodwill Amortization
Accounts Payable
Income Taxes Payable
Provision for Income Taxes
Deferred Income Taxes
Non-Interest bearing Current Liabilities
Other Current Liabilities
Other Current Liabilities %
Other Operating Liablities
Minority Interest
Capitalized Value of Operating Leases
Implied Value of Operating Leases
Unfunded Retirement Liabilities
Implied Value of Unfunded Retirement Liabilities
All Interest Bearing Debt (including Op. Leases and Ret. Liabs)
Net Debt (Includes Operating Leases)
Shareholders Equity
Adjusted Equity
Breakeven NOPLAT
Operating Disadvantage
Operating Advantage
Current Value Breakeven
Total Explainable Value
Value Explained by Disadvantage
Value Explained by Op. Advantage
Future Value Explained by GDP
Future Value Prime
% of Future Value Explained by Disadv.
% of Future Value Explained by GDP
FV Prime %
FV Prime as % of Enterprise Value
Implied Growth
PreTax ROIC w/ GW
PreTax ROIC w/o GW
Average ROIC w/o GW
Average ROIC w/ Goodwill
Mid-Year ROIC w/o NGW
End of Year ROIC with Net Goodwill
End of Year ROIC without Net Goodwill
ROIC - Mid-Year Inv Capital - w/ Goodwill
ROIC - Mid-Year Inv Capital - w/o Goodwill
ROIC - End of Year Inv Capital - w/o Goodwill
ROIC - End of Year Inv Capital- w/ Goodwill
ROIC (w/o goodwill)
Average Spread w/ Goodwill
Average Spread w/o Goodwill
Average Spread w/o NGW
End of Year Spread w/ Goodwill
End of Year Spread w/o Goodwill
Spread - Annual (EOY ROIC - WACC) w/ Goodwill
Spread - Annual (EOY ROIC - WACC) w/o Goodwill
Spread - Annual (Mid-Year ROIC - WACC) w/ Goodwill
Spread - Annual (Mid-Year ROIC - WACC) w/o Goodwill
Spread - Multi-Year Avg (Mid-Year ROIC - WACC) w/ Goodwill
Spread - Multi-Year Avg (Mid-Year ROIC - WACC) w/o Goodwill
Cash/Rev
Net Receivables/Rev
Other Current Assets/Rev
Operating Curr. Assets/Rev
Operating Working Capital/Revs
Inventory/Rev
Net PPE/Revs
Other assets/Revs
Net Other assets/Revs
Goodwill/Revs
Accounts Payable/Rev
SG&A/Revenues
Other Operating Expenses/Revenues
Other Current Liabilities/Revenue
Income Taxes Payable/Rev
Non Interest Bearing Current Liabs/Rev
COGS/Revenues
EBITA/Revenues
Depreciation/Revenues
Market/Book Ratio
Revenues/Invested Capital w/ GW
Revenues/Invested Capital w/o GW
EV (w/o Excess Cash)/Inv Cap (w/ Goodwill)
EV (w/o Excess Cash)/Inv Cap (w/o Goodwill)
Enterprise Value/Inv Capital (w/ Goodwill)
Enterprise Value/Inv Capital (w/o Goodwill)
3 Year TRS (CAGR)
4 Year TRS (CAGR)
5 Year TRS (CAGR)
3 Year Average Spread (w/NGW)
4 Year Average Spread (w/NGW)
5 Year Average Spread (w/NGW)
3 Year Average Spread (without NGW)
4 Year Average Spread (without NGW)
5 Year Average Spread (without NGW)
3 Year Average Revenue Growth
4 Year Average Revenue Growth
5 Year Average Revenue Growth
3 Year Average ROIC (with Goodwill)
4 Year Average ROIC (with Goodwill)
5 Year Average ROIC (with Goodwill)
3 Year Average ROIC (without Goodwill)
4 Year Average ROIC (without Goodwill)
5 Year Average ROIC (without Goodwill)
3 Year Average EBITA/Revenue
4 Year Average EBITA/Revenue
5 Year Average EBITA/Revenue
3 Year Average Revenue/Invested Capital (w/Goodwill)
4 Year Average Revenue/Invested Capital (w/Goodwill)
5 Year Average Revenue/Invested Capital (w/Goodwill)
3 Year Average Debt/Equity Ratio
4 Year Average Debt/Equity Ratio
5 Year Average Debt/Equity Ratio
3 Year Average Revenue/Employee
4 Year Average Revenue/Employee
5 Year Average Revenue/Employee The processing logic 720 may also be in communication with the user interface 730. In one embodiment, the processing logic 720 may receive inputs 732a-732n from the user interface 730, determine various performance metrics and information for a business unit of a company based any combination of the inputs 732a-732n and the financial data received from the various data sources 710a-710n, and generate FV visualizations 734 and other visualizations 736 which may display data points, and the like, related to the performance metrics or information.

Referring now to FIGS. 8-11, exemplary FV visualizations 734 are shown. The FV visualizations 734 may be provided with or without inputs 732a-732n. The purpose of these FV visualizations 734 is to provide graphical depictions of the performance of a business unit relative to its peers, as well as to provide a logical vehicle for receiving inputs 732a-732n related to the FV visualizations 734, if so included. The system 700 may be configured to show a single visualization at a time, or multiple visualizations may be shown simultaneously. In alternate embodiments, a slide show of visualizations may be presented to a user showing the implementation of alternative strategies or different aspects of the same strategy.

Figure 8:
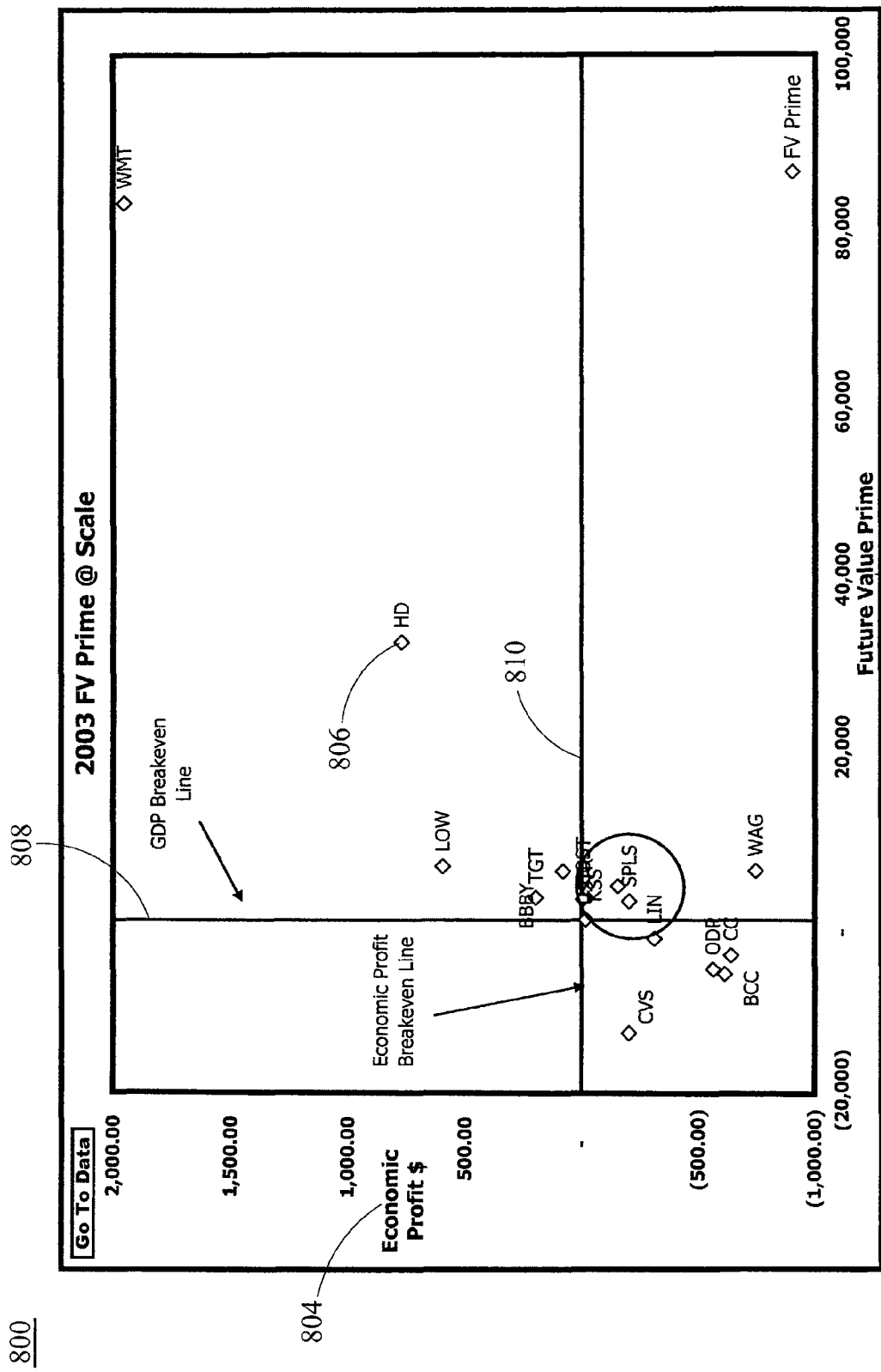
FIG. 8 is an exemplary Future Value (FV) visualization for the analysis tool of FIG. 7.

Referring to FIG. 8, an exemplary FV visualization 800 is shown. In the embodiment of FIG. 8, the processing logic 720 may determine a plurality of data points 806 based on financial data received from various data sources 710a-710n. Each data point 806 is based on at least one of the FV premium methodology 440 components. Data points 806 are calculated for a particular business unit, and each business unit may be associated with more than one depicted data point. A business unit may be representative of a whole company or a business division of a company. For example, each business unit may have a corresponding data point depicted for a given time period. For example, data points may be calculated for each business unit for year-end, semi-annually, quarterly, monthly, weekly, daily time period, or the Twelve Trailing Months (TTM), as shown.

In the embodiment of FIG. 8, the visualization may graphically depict the performance of the FV premium component of a business unit. Accordingly, each data point 806 includes a first component based on the FV premium 802, or FV prime, metric value for the associated business unit. Additionally, each data point may include a second component based on the economic profit 804 metric value for the associated business unit. By plotting a graph using these two components, the visualization 800 may provide a chart of FV premium at scale for the associated business unit. Preferably, the graph includes at least one data point 806 for each of a plurality of business units. Optionally, the visualization 800 may include indicia 808 indicative of the second component of the FV premium methodology 444, that portion of a company's FV predicted by the general growth of the economy. Indicia 810 indicative of an economic profit breakeven line (e.g., profit above the cost of capital) may also be included. As illustrated, the datapoint WMT represents Wal-Mart and shows the large current economic profit generated and a large FV premium, or FV prime.

Figure 9:
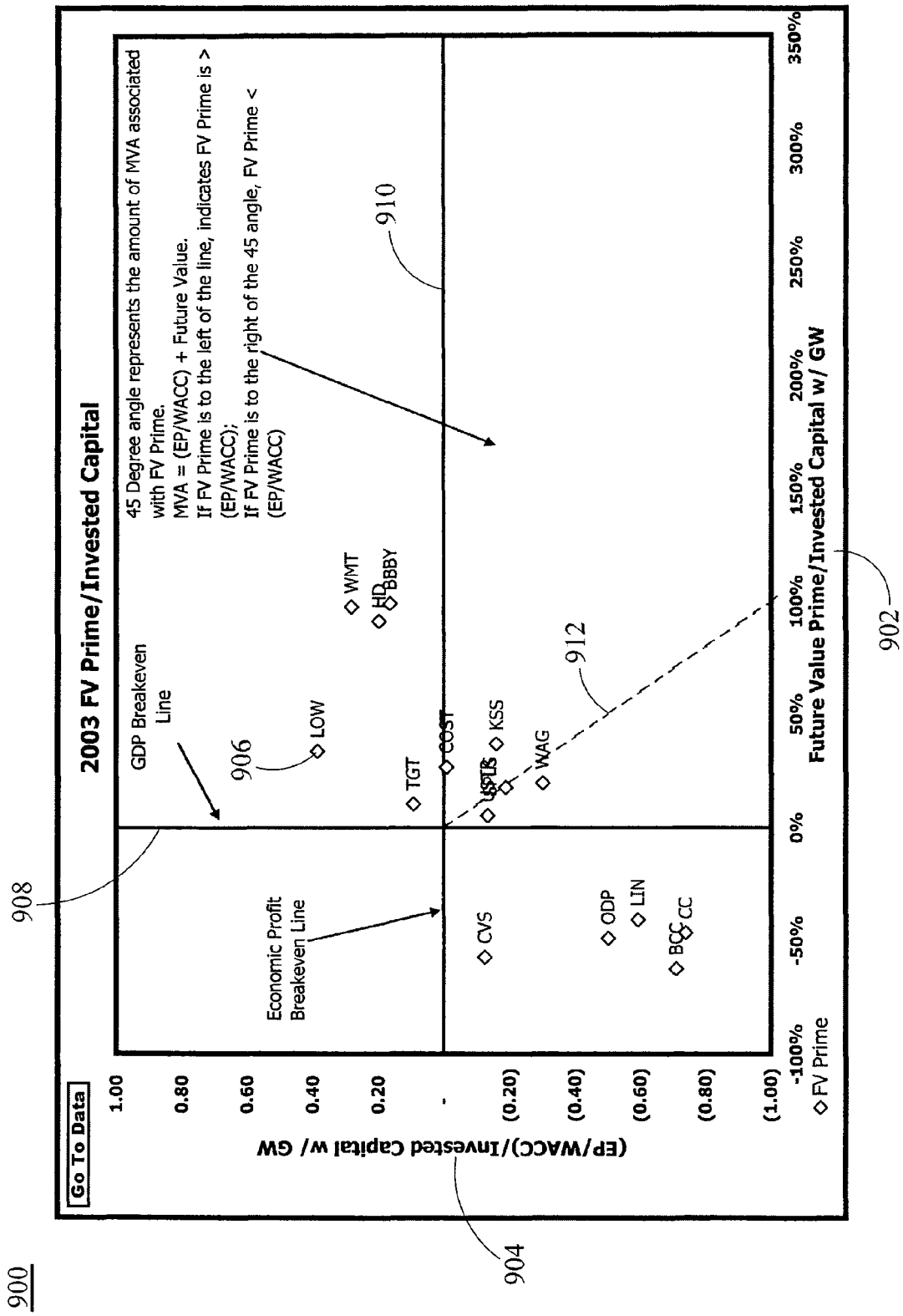
FIG. 9 is another exemplary FV visualization for the analysis tool of FIG. 7.

Referring now to FIG. 9, another exemplary FV visualization 900 is shown. This FV visualization 900 is similar to the FV visualization 800 of FIG. 8 in many respects, however, is designed to provide FV premium versus invested capital information. In other words, this graph normalizes the data shown in FIG. 8 per unit of invested capital in the business unit. This, the data point WMT representing Wal-Mart is closely clustered with smaller companies having similar normalized performance. First, the FV visualization 900 includes a plurality of data points 906 corresponding to performance metrics and information associated with various business units. Each data point 906 includes at least a first and second component. In the embodiment of FIG. 9, the first component is based on the ratio of FV premium over invested capital (with goodwill) 902 for the associated business unit, while the second component is based on the ratio of capitalized economic profit (EP divided by WACC) over the invested capital (with goodwill) 904 of the associated business unit. Also similar to the visualization 800 of FIG. 8, the visualization 900 may include a first indicia 908 indicative of the second component of the FV premium methodology 440 for the business unit and a second indicia 910 indicative of an economic profit breakeven line. Additionally, a third indicia 912 indicative of the relationship between FV premium and market value added for the associated business unit may also be provided. In the embodiment of FIG. 9, the third indicia 912 is provided to indicate an FV premium value greater than economic profit over WACC for the associated business unit for data points to the left of the indicia 912, while the opposite is true for data points 906 to the right of the indicia 912.

Figure 10:
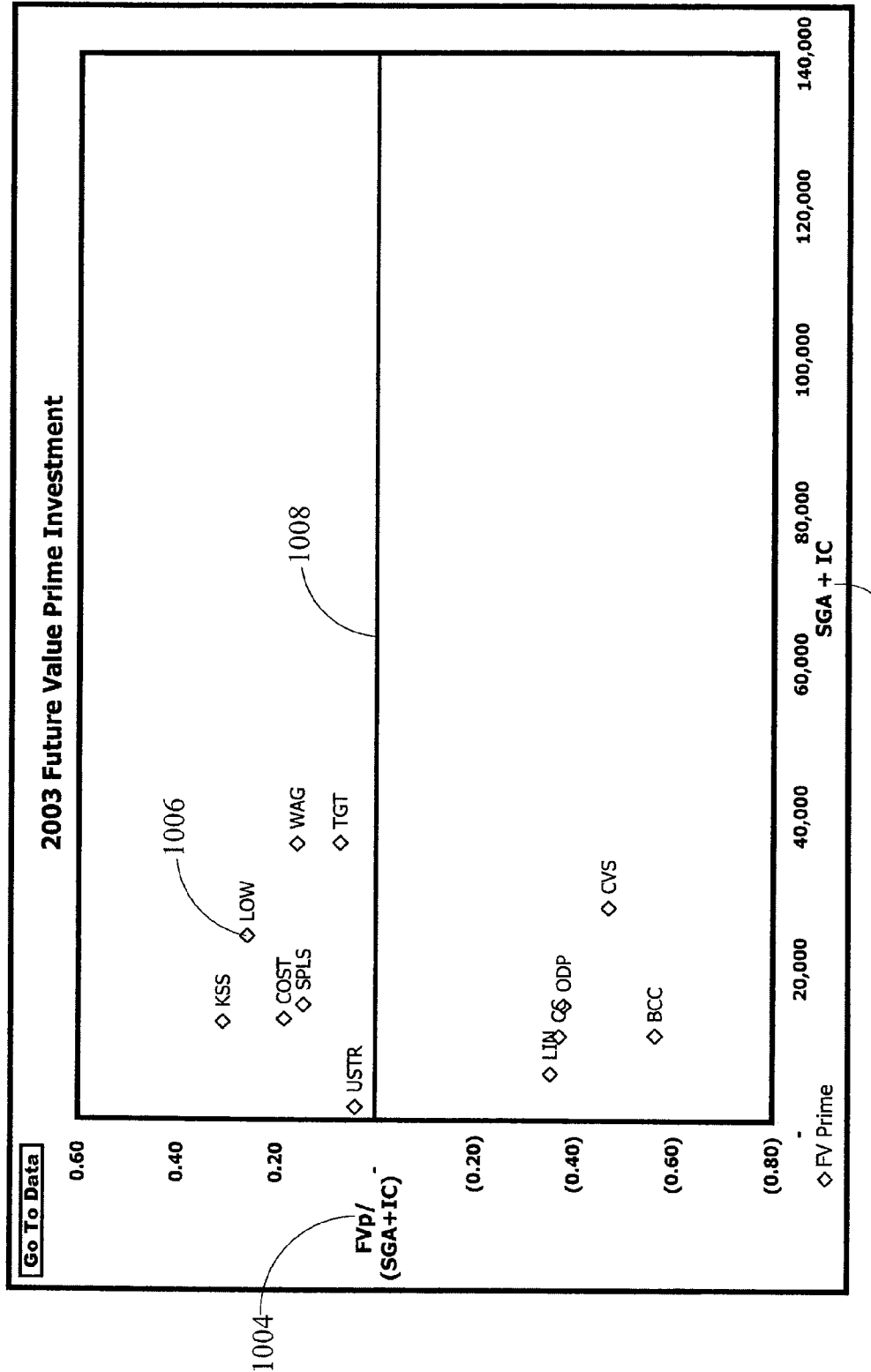
FIG. 10 is another exemplary FV visualization for the analysis tool of FIG. 7.

Referring now to FIG. 10, another exemplary FV visualization 1000 is shown. This visualization 1000 is similar to the FV visualization 800 of FIG. 8 in many respects. First, the FV visualization 1000 includes a plurality of data points 1006 corresponding to performance metrics and information associated with various business units. Each data point 1006 includes at least a first and second component. In the embodiment of FIG. 10, the first component is based on the combination of the sum of all direct and indirect selling expenses and all general and administrative expenses of a company (SGA) and the invested capital 1002 for the associated business unit, while the second component is based on the ratio of FV premium over the combination of SGA and invested capital 1004 of the associated business unit. Thus, one may quickly visualize the relative Future Value generated per unit of expense and capital invested with larger companies towards the right of the chart. Optionally, the visualization 1000 may include a first indicia 1008 indicative of a positive second component 1004.

Figure 11:
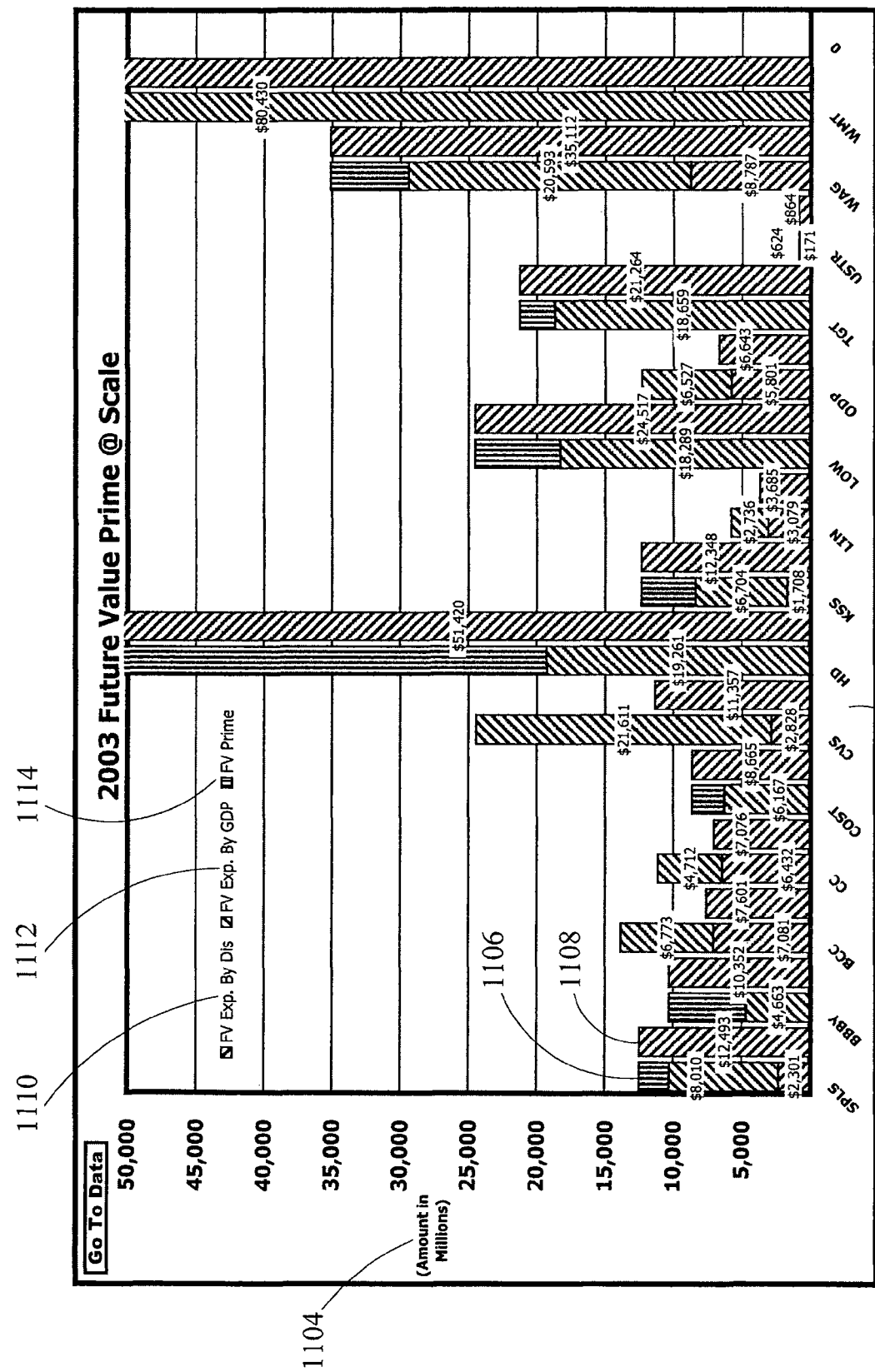
FIG. 11 is another exemplary FV visualization for the analysis tool of FIG. 7.

Referring now to FIG. 11, another exemplary FV visualization 1100 is shown. This visualization 1100 includes a plurality of bars 1106 corresponding to performance metrics and information associated with various business units. In particular, each bar 1106 represents the three components of the FV premium methodology 440 for the associated business unit. Preferably, each component of the bar 1106 is visually distinct from the other components. For example, the first component of the FV premium methodology, or that portion of FV based on an operating advantage/disadvantage 1110 may be displayed in a first manner, such as in a first color. Similarly, the second component of the FV premium methodology 1112, or that portion of FV attributable to the growth of the economy in general, may be provided in a second manner, while the third component of the FV premium methodology 1114, or the FV premium component, may be provided in a third.

Figure 12:
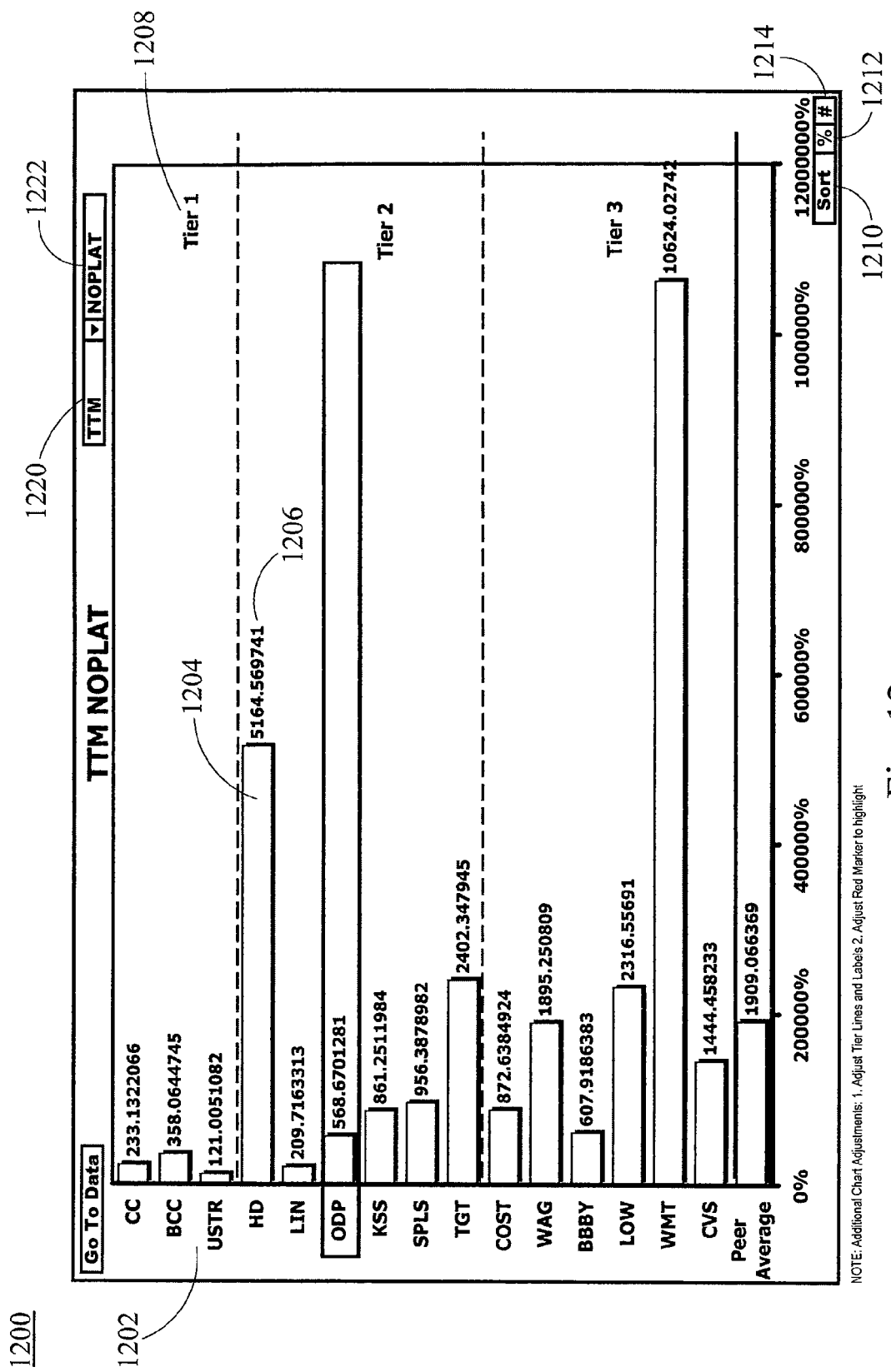
FIG. 12 is an exemplary additional visualization for the analysis tool of FIG. 7.

As described above, the tool may also include one or more additional visualizations 736 for displaying performance metrics and information, such as the performance metrics included in Table 1.0 above, associated with various business units. Preferably, the additional visualizations are provided with controls that allow the user to customize the visualization by selecting the time period and performance metrics displayed in the visualization. An exemplary additional visualization 1200 is shown in FIG. 12. In the embodiment of FIG. 12, the visualization is designed to provide information for a particular performance metric for each of a plurality of business unit. The visualization 1200 may include a bar 1204 indicative of a selected metric for each of a plurality of business units 1202. Controls may also be provided to allow the user to select the time period 1220 and performance metric 1222 being displayed using pull-down menus. Optionally, additional controls or active buttons that allow the user to sort 1210 the business units 1202 may also be provided. In one embodiment, buttons are provided for toggling the information displayed between relative values 1212 and absolute values 1214.

Figure 13:
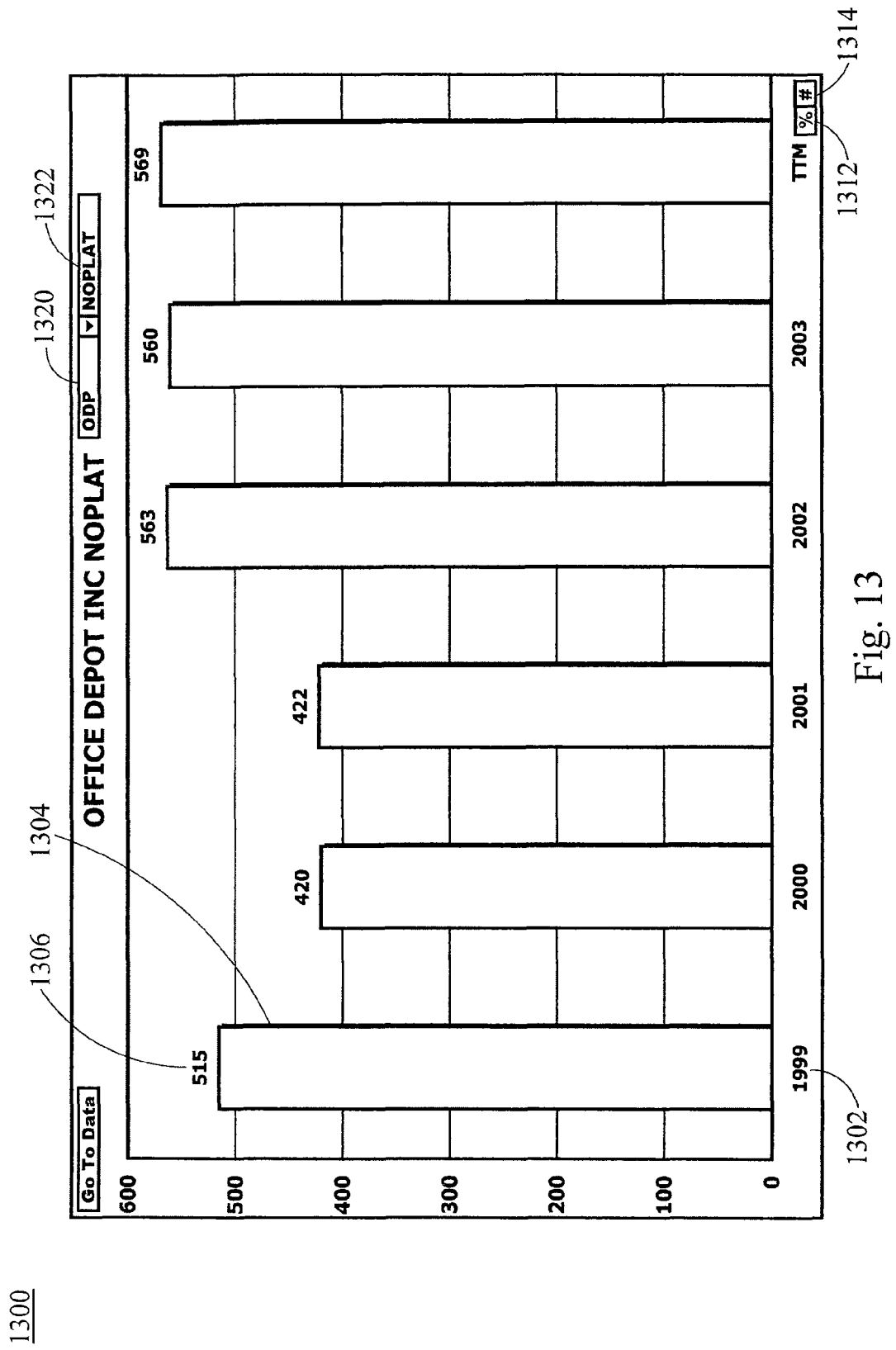
FIG. 13 is another exemplary additional visualization for the analysis tool of FIG. 7.

Referring to FIG. 13, an exemplary additional visualization 1300 for providing historic information for a particular performance metric for a particular business unit is shown. The visualization 1300 may include a bar 1304 indicative of a selected metric for a particular time period 1302 of the business unit. Optionally, the value 1306 of the performance metric may also be displayed. Controls may be provided to allow the user to select the business unit 1320 and performance metric 1322 being displayed. Optionally, additional controls that allow the user to toggle the information displayed between relative values 1312 and absolute values 1314. Optionally, controls may be included to change the date range of the historical data displayed on the visualization.

Referring to FIGS. 14-17, addition visualizations 736 may also be provided with controls that allow the user to completely customize the visualization. For example, visualizations 736 may be provided to allow the user to graph a performance metric versus a performance metric, a ratio of performance metrics versus a performance metric, a performance metric versus a ratio of performance metrics, and two ratios of performance metrics. The visualizations 736 may also allow the user to select multiple time periods for which data points are calculated. In one embodiment, the visualization 736 includes multiple data points for each business unit. For example, data points may be determined for each of a plurality of time periods. Plotting data points for each of a plurality of business units across time allows an individual to quickly and easily determine trends, strategies, and efficiencies for a particular group of related business units. While the embodiments of FIGS. 14-17 relate to X-Y scatter charts, it should be apparent to one of ordinary skill in the art that the principles described herein could be applied to generate any type of chart, graph or visualization, such as bar graphs, bubble graphs, and the like.

Figure 14:
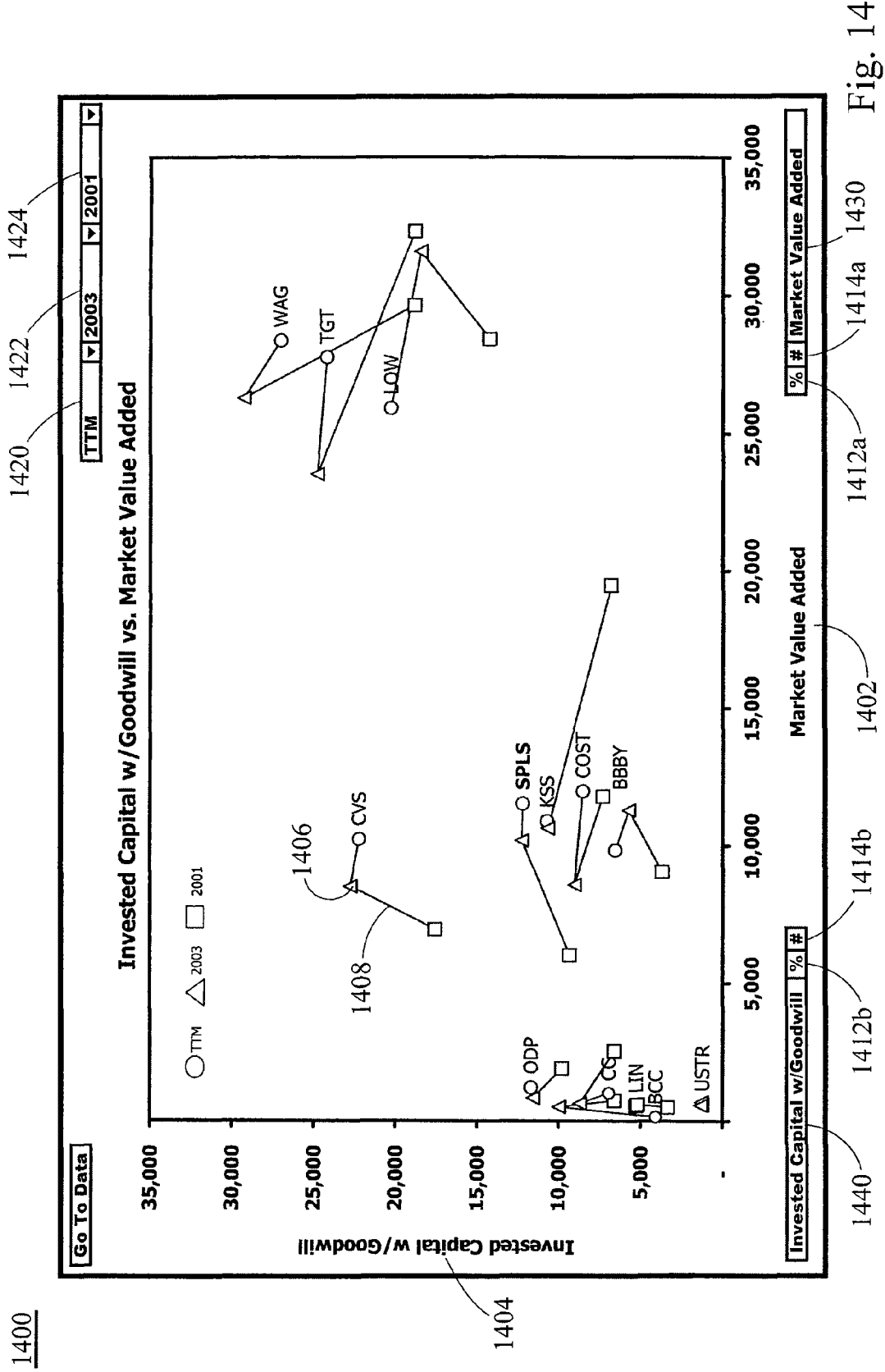
FIG. 14 is another exemplary additional visualization for the analysis tool of FIG. 7.

Referring to FIG. 14, an exemplary additional visualization 1400 that allows a user to customize a graph of a performance metric versus a performance metric is shown. The visualization 1400 includes a plurality of data points 1406 associated with a particular business unit. In the embodiment of FIG. 14, each data point 1406 includes a first component indicative of a first-performance metric or variable 1402 for a business unit and a second component indicative of a second performance metric or variable 1404 for a business unit and a third component indicative of the time period to which the first and second metrics correspond. The user may specify the performance metric indicated by the first and second components via the respective controls 1430 and 1440 which may include pull down menus. Performance metrics may be selected from, but not limited to, invested capital (with or without goodwill), market value added, market capitalization, shareholder equity, NOPLAT, WACC, and revenue. In one embodiment, any metric in Table 1.0 may be selected. In response to the selection of components by the user, the system 700 may retrieve financial data associated with the business unit and determine the data points 1406 based on the selected components. In one embodiment, the data may be retrieved from a table including pre-calculated data for each available performance metric. Alternatively, or in addition to, the metrics may be calculated after the selection is made.

Optionally, controls may also be provided that allow the user to toggle the information displayed between relative values 1412a, 1412b and absolute values 1414a, 1414b for each of the performance metrics. Thus, the data may be shown at scale or normalized to a ratio. Preferably, the visualization includes a plurality of data points 1406 for each business unit, where each data point 1406 corresponds to a time periods 2001, 2003, and the twelve trailing months. In the embodiment of FIG. 14, the visualization 1400 includes three data points 1406 for each business unit, each calculated for a specific time period. Trend lines 1408 may also be included to connect data points for a particular business unit. Controls may also be provided to allow the user to select a time period for the first time period 1420, second time period 1422, and third time period 1424. In response to the selection time periods, the system 700 may determining new data points 1406 and trend lines 1408 corresponding to the selected metrics and time periods and update the visualization 1400 accordingly.

Figure 15:
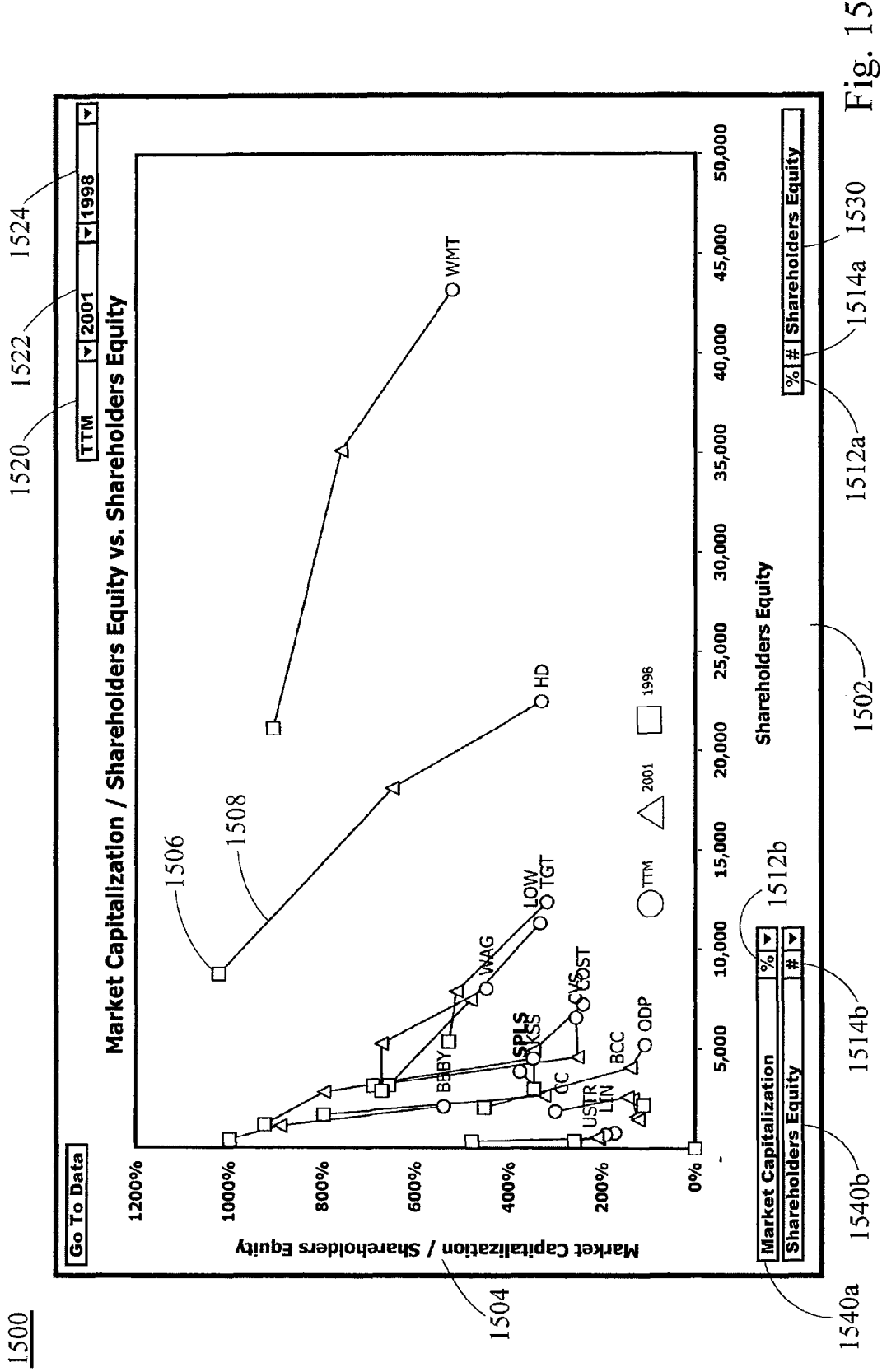
FIG. 15 is another exemplary additional visualization for the analysis tool of FIG. 7.

Referring to FIG. 15 another exemplary additional visualization 1500 is shown. In the embodiment of FIG. 15, the visualization 1500 includes a plurality of data points 1506 associated with a particular business unit and allows a user to customize a graph of a ratio of performance metrics versus a performance metric. In the embodiment of FIG. 15, each data point 1506 includes a first component indicative of a performance metric 1502 for a business unit and a second component indicative of a ratio between performance metrics 1504 for a business unit. The user may specify the performance metric indicated by the first components via the controls 1530. Similarly, the user may specify each performance metrics of the ratio 1504 via the controls 1540a and 1540b for the numerator metric and denominator metric, respectively. Optionally, controls may also be provided that allow the user to toggle the information displayed between relative values 1512a, 1512b and absolute values 1514a, 1514b for any of the performance metrics or ratio. Similarly to the visualization 1400 of FIG. 14, the visualization preferably includes a plurality of data points 1506 for each business unit, where each data point 1506 corresponds to a time period. For example, the visualization 1500 may include three data points 1506 for each business unit, each calculated for a specific time period, as well as controls that allow the user to select the first time period 1520, second time period 1522, and third time period 1524. Optionally, additional controls for periods and data points 1506 for those additional time periods may be included.

Figure 16:
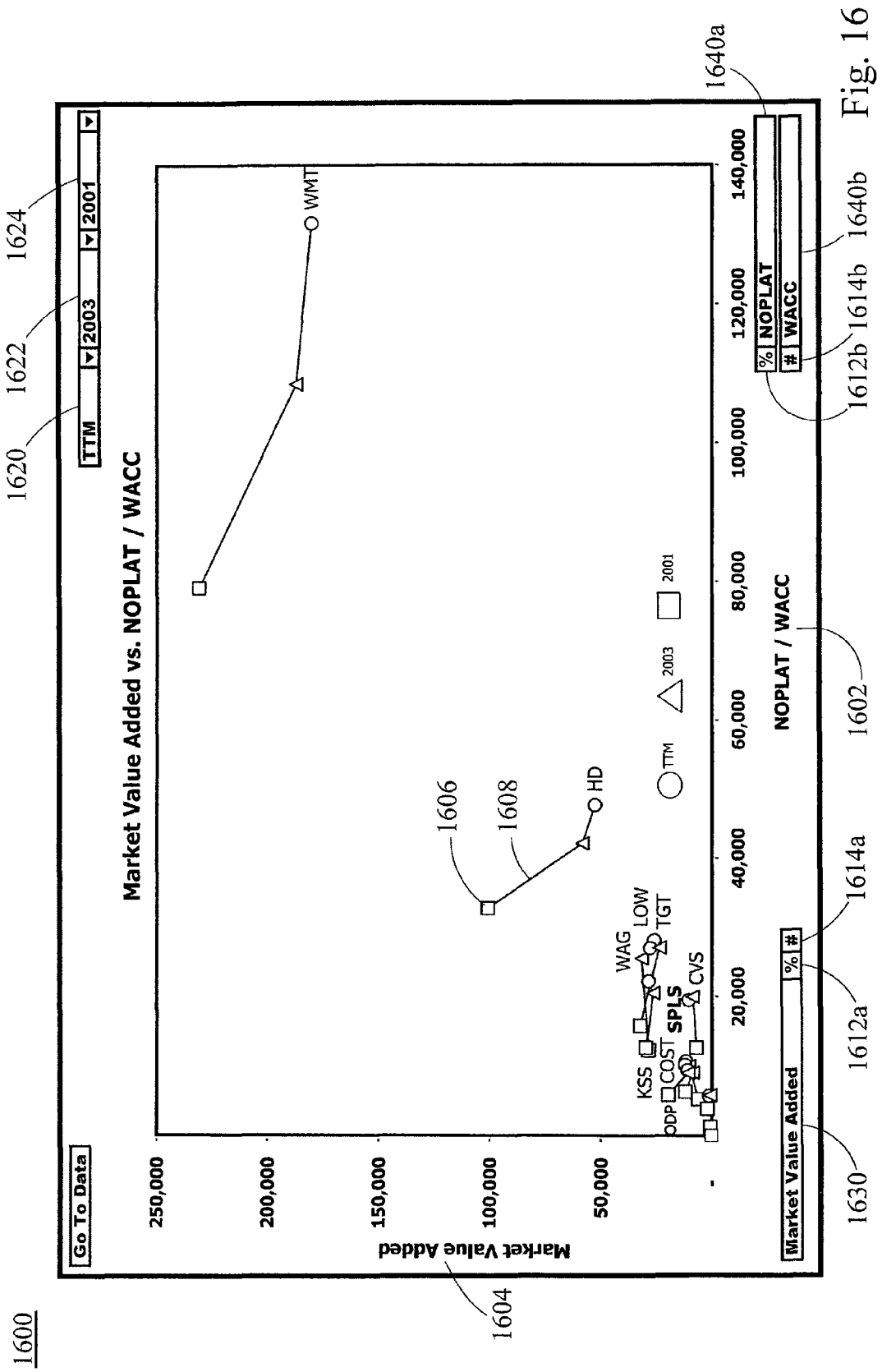
FIG. 16 is another exemplary additional visualization for the analysis tool of FIG. 7.

Similarly, FIG. 16 shows another exemplary visualization 1600 for graphing of a performance metric versus a ratio of performance metrics. In the embodiment of FIG. 16, each data point 1606 includes a first component indicative of a performance metric 1604 for a business unit and a second component indicative of a ratio between performance metrics 1602 for a business unit. Again, the user may specify the performance metric indicated by the first component 1604 via the control 1630 and each performance metric of the ratio 1602 via the controls 1640a and 1640b. The selected performance metrics also are displayed as labels on the axes of the chart. Optionally, controls may also be provided that allow the user to toggle the information displayed between relative FIGS. 1612a, 1612b and absolute FIGS. 1614a, 1614b for any of the performance metrics or ratio. Optionally, the visualization 1600 may include three or more data points 1606 for each business unit, each calculated for a specific time period, and rend lines 1608 connecting the data points. Controls are provided that allow the user to select a time period for the first time period 1620, second time period 1622, and third time period 1624.

Figure 17:
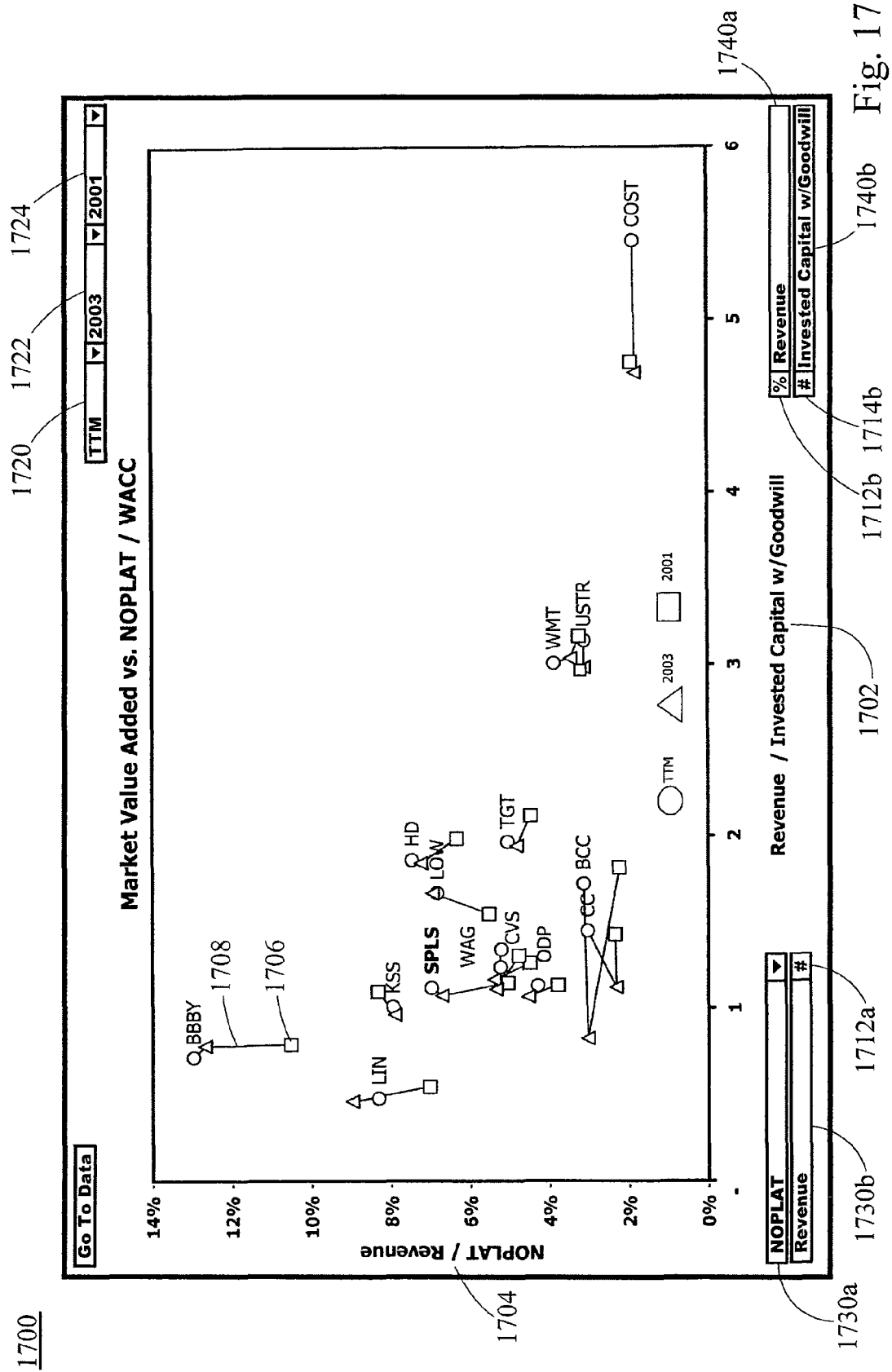
FIG. 17 is another exemplary additional visualization for the analysis tool of FIG. 7.

Finally, another exemplary visualization 1700 for graphing of a ratio of performance metrics versus a ratio of performance metrics is shown in FIG. 17. In the embodiment of FIG. 17, each data point 1706 includes a first component indicative of a first ratio of performance metrics 1702 for a business unit and a second component indicative of a second ratio between performance metrics 1704 for a business unit and corresponds to a selected time period. Again, the user may specify either performance metric of the first ratio 1702 via the controls 1740a and 1740b and each performance metric of the second ratio 1704 via the controls 1730a and 1730b. Optionally, controls may also be provided that allow the user to toggle the information displayed between relative FIGS. 1712a, 1712b and absolute FIGS. 1614a, 1614b for any of the ratios of performance metrics. The visualization 1700 may also include three or more data points 1706 for each business unit, each calculated for a specific time period, as well as controls that allow the user to select a time period for the first time period 1720, second time period 1722, and third time period 1724.

Based on the teachings described herein, others of ordinary skill in the art will appreciate other applications of the system, apparatus and methods in accordance with this invention. Accordingly, it is therefore intended that the foregoing detailed description be regarded as illustrative rather than limiting, and that it be understood that it is the following claims, including all equivalents, that are intended to define the spirit and scope of this invention.

What is claimed is:

1. A method comprising:
   receiving, into a computer readable memory coupled to a computer data processor, financial data about a company and an index value indicative of the economic growth for an industrial sector of a country relevant to the company;
   determining with the data processor a current value and a future value;
   decomposing with the data processor the future value into a plurality of future value components; and
   displaying, on a display device, at least one of the future value components.

2. The method of claim 1, wherein the plurality of financial data includes an invested capital value, and wherein the plurality of future value components include a future value (FV) premium component comprising the difference between the future value of the company and a sum of the economy component and an operating advantage component that is calculated as a function of the invested capital value.

3. The method of claim 2, wherein the plurality of financial data includes a Weighted Average Cost of Capital (WACC) value, and wherein the operating advantage component is calculated by dividing an economic profit of the current value for the company by the WACC, the economic profit of current value being equal to a NOPLAT value less a capital charge value, the NOPLAT value being indicative of a net operating profit less adjusted taxes value for the company, the capital charge value being equal to the invested capital value of the company multiplied by WACC value.

4. The method of claim 1, wherein the displaying further includes displaying an indicia of a Gross Domestic Product (GDP) breakeven line.

5. The method of claim 1, wherein the displaying at least one of the future value components further includes displaying a FV premium component.

6. The method of claim 5, wherein the displaying further includes displaying an indicia of the amount of market value added (MVA) with the FV premium component.

7. The method of claim 2, wherein the displaying at least one of the future value components further includes displaying an economy component, the operating advantage component, and a FV premium component.

8. The method of claim 1, where the current value and the future value make up an enterprise value of the company, the method further comprising:
   receiving financial data about a plurality of additional companies;
   determining another current value and another future value which combined equal an enterprise value for each of the plurality of additional companies;
   decomposing each future value of the plurality of additional companies into a plurality of future value components, wherein the plurality of future value components includes an economy component that defines an implied amount of growth of the company expected by the growth of the industrial sector of the economy relevant to the company; and
   displaying at least one of the future value components for at least one of the plurality of additional companies.

9. A method comprising:
   receiving, into a computer readable memory coupled to a computer data processor, financial data about a company;
   determining with the data processor a current value and a future value;
   decomposing with the data processor the future value into a plurality of future value components; and
   displaying, on a display device, at least one of the future value components.

10. The method of claim 9, wherein the financial data includes an invested capital value, and an operating advantage future value component that is calculated as a function of the invested capital value.

11. The method of claim 10, wherein the future value includes a future value premium component, wherein the current value and the future value combined make up an enterprise value of the company, wherein the financial data includes a Weighted Average Cost of Capital (WACC) value, and wherein the operating advantage component is calculated by dividing an economic profit of the current value for the company by the WACC, the economic profit of current value being equal to a NOPLAT value less a capital charge value, the NOPLAT value being indicative of a net operating profit less adjusted taxes value for the company, the capital charge value being equal to the invested capital value of the company multiplied by WACC value.

12. A computer-implemented method comprising:
   receiving, into a computer readable memory coupled to a computer data processor, publicly available historical financial data in an electronic readable format about a plurality of business units from a data source;
   calculating with the data processor a plurality of ratios of financial performance measures based on the received financial data;
   selecting a business unit from the plurality of business units and generating with the data processor a plurality of data points based on the received data and calculated performance measures for the selected business unit; and
   displaying, on a display device, the plurality of data points on a graph.

13. The computer-implemented method of claim 12, further comprising:
   providing controls for selecting a first variable from a plurality of variables, wherein the first variable is a ratio of two independently selected variables, the first variable being associated with a first coordinate;
   providing controls for selecting a second variable from the plurality of variables, wherein the second variable is a ratio of two independently selected variables, the second variable being associated with a second coordinate; and
   displaying a second graph of a first performance metric versus a second performance metric.

14. The computer-implemented method of claim 13, further comprising providing user interface controls to allow selection of an input indicative of the first performance metric or the second performance metric.

15. The computer-implemented method of claim 13, further comprising displaying a second graph of a ratio of a first performance metric to a second performance metric versus a third performance metric.

16. The computer-implemented method of claim 15, further comprising providing user interface controls to allow selection of an input indicative of the first performance metric, the second performance metric, or the third performance metric.

17. The computer-implemented method of claim 13, further comprising displaying a second graph of a first performance metric versus a ratio of a second performance metric to a third performance metric.

18. The computer-implemented method of claim 17, further comprising providing user interface controls to allow selection of an input indicative of the first performance metric, the second performance metric, or the third performance metric.

19. The computer-implemented method of claim 13, further comprising displaying a second graph of a first ratio between a first performance metric and a second performance metric versus a second ratio to a third performance metric and a fourth performance metric.

20. The computer-implemented method of claim 19, further comprising providing user interface controls to collect an input indicative of the first performance metric, the second performance metric, the third performance metric, or the fourth performance metric.

21. The computer-implemented method of claim 13, wherein the received historical financial data further includes a Gross Domestic Product (GDP) value indicative of the GDP for a country and the displaying further includes depicting on the graph an indicia indicative of a GDP breakeven line associated with an implied amount of growth of the company attributable to the growth of the economy in general and based on the GDP value.

22. The computer-implemented method of claim 13, wherein the plurality of financial data includes an invested capital value.

23. The computer-implemented method of claim 22, wherein the plurality of financial data includes a Weighted Average Cost of Capital (WACC) value, and wherein the operating advantage component is calculated by dividing an economic profit of the current value for the company by the WACC, the economic profit of current value being equal to a NOPLAT value less a capital charge value, the NOPLAT value being indicative of a net operating profit less adjusted taxes value for the company, the capital charge value being equal to the invested capital value of the company multiplied by WACC value.

24. The computer-implemented method of claim 13, wherein at least one of the plurality of ratios of financial performance measures includes a future value component, the future value component selected from the group consisting of:
  (i) an economy component that defines an implied amount of growth of the company attributable to the growth of the economy in general,
  (ii) an operating advantage component that is calculated as a function of the invested capital value, and
  (iii) a future value (FV) premium component comprising the difference between the future value of the company and a sum of the economy component and the operating advantage component.

* * * * *